United States Patent
Araki et al.

(10) Patent No.: US 6,726,994 B1
(45) Date of Patent: Apr. 27, 2004

(54) STRUCTURAL MEMBER OF FLUORINE-CONTAINING POLYMER HAVING ADHESIVE PROPERTY AT HIGH TEMPERATURE AND SLIDING MATERIAL PRODUCED BY USING SAME

(75) Inventors: Takayuki Araki, Settsu (JP); Tsuyoshi Miyamori, Settsu (JP); Masaji Komori, Settsu (JP); Yoshito Tanaka, Settsu (JP); Masahiro Kumegawa, Kagawa (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/856,066

(22) PCT Filed: Nov. 16, 1999

(86) PCT No.: PCT/JP99/06377

§ 371 (c)(1), (2), (4) Date: May 17, 2001

(87) PCT Pub. No.: WO00/29210

PCT Pub. Date: May 25, 2000

(30) Foreign Application Priority Data

Nov. 18, 1998 (JP) ............................................. 10/328591

(51) Int. Cl.$^7$ ......................... B32B 15/08; B32B 27/28; B32B 27/30; B32B 27/34; B32B 27/42
(52) U.S. Cl. .................... 428/411.1; 428/419; 428/421; 428/422; 428/457; 428/473.5; 428/474.4; 428/480; 428/524
(58) Field of Search ................................. 428/421, 422, 428/411.1, 457, 473.5, 480, 524, 419, 474.4

(56) References Cited

U.S. PATENT DOCUMENTS 3,855,191 A * 12/1974 Doughty et al. ............ 526/214
4,016,375 A * 4/1977 Van Turnhout ............. 307/400
4,048,370 A * 9/1977 Orkin et al. ................. 264/242
4,127,615 A * 11/1978 Zahir et al. ................. 525/502
4,333,977 A * 6/1982 Abrahams et al. .......... 428/131
4,916,020 A * 4/1990 Golding et al. ............. 428/421

FOREIGN PATENT DOCUMENTS

| EP | 0 866 107 | 9/1998 |
| EP | 0 866 108 | 9/1998 |
| JP | 10-278193 | 10/1998 |
| WO | WO 9721776 A1 * | 6/1997 |
| WO | 98/50229 | 11/1998 |

OTHER PUBLICATIONS

Encyclopedia of Polymer Science and Engineering, vol. 6, Engineering Plastics: Resins, pp. 103–127, Jun. 1987.*
English translation fo WO 97/21776 A1, Jun. 1997.*
Encyclopedia of Polymer Science and Engineering, vol. 3: Composites, pp. 776–777, Nov. 1985.*
International Preliminary Examination Report for PCT/JP99/06377, dated Feb. 6, 2001.

* cited by examiner

Primary Examiner—Ramsey Zacharia
(74) Attorney, Agent, or Firm—Sughrue Mion, PLLC

(57) ABSTRACT

The structural member of the present invention comprises (A) a layer which comprises a fluorine-containing polymer and does not contain an adhesive material other than the fluorine-containing polymer substantially and (B) a substrate, in which the layer (A) is adhered directly to the substrate (B) without interposing a binder therebetween and a longitudinal shear strength between the layer (A) comprising a fluorine-containing polymer and the substrate (B) is not less than 0.98 N/mm$^2$ at 150° C. The structural member comprising a fluorine-containing polymer and a substrate adhered to each other, particularly the structural member having improved adhesive strength at high temperature and the sliding material produced by using the structural member are provided.

21 Claims, 6 Drawing Sheets

STRUCTURAL MEMBER OF FLUORINE-CONTAINING POLYMER HAVING ADHESIVE PROPERTY AT HIGH TEMPERATURE AND SLIDING MATERIAL PRODUCED BY USING SAME

TECHNICAL FIELD

The present invention relates to a structural member produced by directly adhering a heat resistant fluorine-containing polymer to a substrate, particularly a structural member having enhanced adhesive strength at high temperature, and a structural member produced by providing a layer of fluorine-containing polymer or heat resistant engineering plastic having heat resistance and sliding properties (friction property, abrasion resistance) on the fluorine-containing polymer layer of the above-mentioned structural member.

Further the present invention relates to a multi-layered sliding material and sliding parts having improved heat resistance of adhesive strength and produced by using those structural members.

BACKGROUND ART

Fluorine-containing polymers represented by PTFE and PFA and compositions reinforced by blending a filler thereto are used for sliding material and parts because of excellent heat resistance, friction property and abrasion resistance. For example, a steel substrate on which the above-mentioned fluorine-containing material is applied is used as a bearing for general industrial machinery.

However the fluorine-containing polymers have a substantial problem that adhesion thereof to a substrate of metal, etc. is poor due to excellent non-sticking property and friction property thereof.

For adhering a fluorine-containing polymer film or sheet to a metal, there is used, for example, a method of subjecting an adhering surface of the film to chemical preparation treatment such as sodium etching and then adhering the film to the metallic substrate subjected to roughening of a surface thereof physically by sand blasting or the like by using an epoxy resin adhesive.

However that method has problems that

① there are a danger in handling a sodium etching treating solution and a fear of environmental contamination, and much time and labor are required for processing including treatment of the epoxy resin adhesive, which causes an increase in cost, ② the fluorine-containing polymer itself is deteriorated by the chemical surface preparation by sodium etching and heat resistance thereof is lowered, ③ heat resistance of an epoxy resin to be used as an adhesive is insufficient and the resin is deteriorated to cause air bubbles and peeling when used at high temperature for a long period of time, and ④ an adhesive strength of the obtained laminated article is insufficient, and even if the adhesive strength is maintained at room temperature, in case of a high temperature, particularly at a temperature of not less than 150° C., the adhesive strength is lowered rapidly.

Particularly due to the problems of ③ and ④, it is difficult to use those laminated sliding materials for a bearing to be used for internal combustion engine which is subject to high temperature and high load.

Objects of the present invention are to provide a structural member which is produced by directly adhering a fluorine-containing polymer to a substrate and has improved adhesive strength particularly at high temperature, and to provide a sliding material and sliding parts such as a bearing which are excellent in heat resistance of adhesive strength by laminating a material of fluorine-containing polymer or heat resistant engineering plastic excellent in sliding property to the above-mentioned structural member.

The inventors of the present invention have made intensive studies to achieve the above-mentioned purpose, and as a result, have found that when a structural member is produced by directly adhering, to a substrate, a layer of a specific heat resistant fluorine-containing polymer under the condition of the polymer substantially containing no adhesive material other than the fluorine-containing polymer and without using an adhesive layer of a binder or the like, an adhesive strength at high temperature can be improved.

DISCLOSURE OF INVENTION

Namely, the structural member of the present invention comprises (A) a layer which comprises a fluorine-containing polymer and does not contain an adhesive material other than the fluorine-containing polymer substantially and (B) a substrate, in which the layer (A) is adhered directly to the substrate (B) without interposing a binder therebetween and a longitudinal shear strength between the layer (A) and the substrate (B) is not less than 0.98 N/mm$^2$ (10 kgf/cm$^2$) at 150° C.

The structural member of the present invention can be used effectively for applications exposed to high temperature such as a sliding material, OA roll, OA belt, heating apparatuses for cooking and heat resistant electric wire.

BEST MODE FOR CARRYING OUT THE INVENTION

Figure 1:
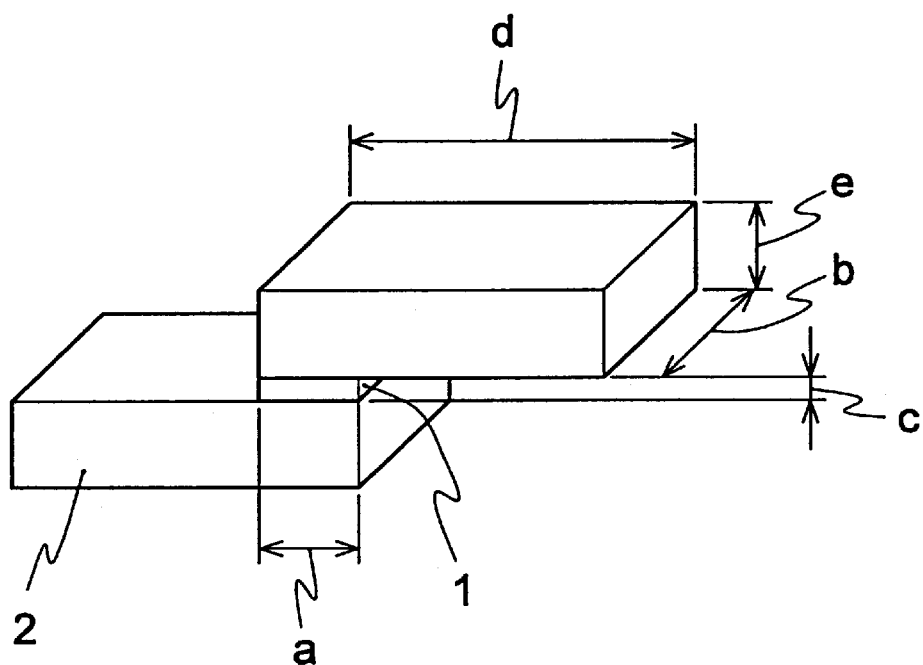
FIG. 1 is a diagrammatic perspective view of a test piece to be subjected to adhesion test (tensile shear strength test) in the present invention.

With respect to preferable adhesive strength, a longitudinal shear strength at 200° C. is not less than 0.98 N/mm$^2$ (10 kgf/cm$^2$), and further a longitudinal shear strength at 150° C. is not less than 1.96 N/mm$^2$ (20 kgf/cm$^2$), more preferably not less than 2.94 N/mm$^2$ (30 kgf/cm$^2$), further not less than 4.90 N/mm$^2$ (50 kgf/cm$^2$).

If an adhesive strength at high temperature is less than the above-mentioned values, in case where the structural member is used for sliding application such as a bearing (around an engine) to be heated to a high temperature, peeling occurs because a load is applied in a shearing direction, and therefore a sliding property cannot be maintained.

In the present invention, the longitudinal shear strength represents a value measured by the test method specified in JIS K 6850.

In the structural member of the present invention, the fluorine-containing polymer itself to be used for the layer (A) comprising the fluorine-containing polymer is necessary to have heat resistance and is usually selected from fluorine-containing ethylenic polymers.

It is preferable that a thermal degradation temperature at 1% weight loss of the fluorine-containing polymer which is measured in the air with a DTGA analyzer is not less than 300° C. and a crystalline melting point thereof is not less than 250° C.

The thermal degradation temperature at 1% weight loss is preferably not less than 320° C., most preferably not less than 330° C.

Also the crystalline melting point is further preferably not less than 300° C.

If the thermal degradation temperature is too low, the polymer cannot stand heat generated by abrasion, air bubbles and peeling arise and durability is lowered.

Also if the crystalline melting point is too low, when generation of heat of not less than the melting point arises, melting occurs and a shape cannot be maintained stably. Also even if generated heat is not more than the melting point, a mechanical strength of the layer of fluorine-containing polymer is lowered rapidly, a breakage of the layer easily occurs by a load in the shearing direction and good adhesive strength cannot be obtained, which lowers durability and abrasion resistance.

Examples of the preferred heat resistant fluorine-containing polymer are fluorine-containing polymers mainly comprising tetrafluoroethylene. Examples thereof are as follows.

(I) Tetrafluoroethylene homopolymer (PTFE) or tetrafluoroethylene copolymers comprising not less than 99.7% by mole of tetrafluoroethylene (So-called modified PTFE prepared by copolymerizing other comonomer in a small amount not imparting a melt flowability to the tetrafluoroethylene polymer. Examples of the other comonomer are hexafluoropropylene, chlorotrifluoroethylene, perfluoro(alkyl vinyl ether), trifluoroethylene, perfluoroalkylethylene, and the like. A proportion of the comonomer varies depending on kind thereof. When perfluoro(alkyl vinyl ether) is used as a comonomer, its amount is usually up to 2% by weight, preferably 0.01 to 1% by weight.)

Those fluorine-containing polymers are most excellent in heat resistance, chemical resistance and non-sticking property, and is excellent particularly in sliding property (friction property, abrasion resistance).

(II) Polymers comprising 85 to 99.7% by mole of tetrafluoroethylene and 0.3 to 15% by mole of a monomer represented by the formula (1):

$$CF_2=CFR_f \qquad (1)$$

wherein $R_f$ is $CF_3$ or $OR_f^1$, in which $R_f^1$ is a perfluoroalkyl group having 1 to 5 carbon atoms. Examples thereof are tetrafluoroethylene/perfluoro(propyl vinyl ether) copolymer (PFA), tetrafluoroethylene/hexafluoropropylene copolymer (FEP), tetrafluoroethylene/perfluoro(propyl vinyl ether)/hexafluoropropylene terpolymer, tetrafluoroethylene/perfluoro(propyl vinyl ether)/perfluoro(methyl vinyl ether) terpolymer, and the like.

Those fluorine-containing polymers (II) have heat resistance, chemical resistance, non-sticking property and friction property nearly equivalent to those of the fluorine-containing polymers (I), and are excellent from the viewpoint of transparency and melt-processability and from the point that even in case of application in the form of a coating, it is possible to make the polymer layer transparent and a surface thereof smooth by heat.

(III) A polymer comprising 40 to 80% by mole of tetrafluoroethylene, 20 to 60% by mole of ethylene and 0 to 15% by mole of other copolymerizable monomer (ETFE)

This polymer is excellent from the points that the polymer has excellent heat resistance, stain-proofing property, weather resistance and transparency, that the polymer has an excellent mechanical strength, hardness and rigidity and that since a melt flowability is excellent, processing can be easily carried out at relatively low temperature and a combined use (lamination, etc.) with a resin substrate is easy.

The substrate (B) of structural member of the present invention is selected depending on purpose, application, shapes of parts and environment and also depending on where it is used. The substrate (B) is selected from those having heat resistance and a high strength, particularly a high mechanical strength at high temperature, particularly from those which have a high effect of reinforcing the layer (A) when adhered to the layer (A) and used under various conditions and can give mechanical characteristics when formed into the structural member of the present invention and used as mechanical parts and structural parts. For example, there are substrates of metal, glass, inorganic material and synthetic resin. Synthetic resin is selected from those excluding fluorine-containing polymers, particularly aromatic polyester, heat resistant engineering plastics such as PEEK, PES, PPS, PAI, PEI and thermoplastic PI, heat resistant thermosetting resins such as polyimide, phenolic resin and COPNA resin, and the like.

When the structural member of the present invention is used as a sliding member, a metallic substrate is preferable from the viewpoint of excellent characteristics such as strength, heat resistance and shock resistance and also good processability (post-processability) in case of use as parts, and a synthetic resin substrate is preferable from the viewpoint of flexibility and processability.

Metals of the metallic substrate encompass individual metals, alloys of two or more metals, metal oxides, metal hydroxides and metal salts such as carbonates and sulfates. Among them, individual metals, metal oxides and alloys are preferable from the viewpoint of adhesive property.

Examples of the metallic substrate are metals and metal compounds of aluminum, iron, nickel, titanium, molybdenum, magnesium, manganese, copper, silver, lead, tin, chromium, beryllium, tungsten and cobalt, alloys of two or more thereof, etc.

Examples of the alloys are alloy steels such as carbon steel, Ni steel, Cr steel, Ni—Cr steel, Cr—Mo steel, stainless steel, silicon steel and permalloy; aluminum alloys such as Al—Cl, Al—Mg, Al—Si, Al—Cu—Ni—Mg and Al—Si—Cu—Ni—Mg; copper alloys such as brass, bronze, silicon bronze, silicon brass, nickel silver and nickel bronze; nickel alloys such as nickel manganese (D nickel), nickel-aluminum (Z nickel), nickel-silicon, Monel metal, Constantan, nichrome Inconel and Hastelloy; and the like.

Further as the aluminum-based metal, there can be used pure aluminum; aluminum oxide; and aluminum alloys for casting and expanding such as Al—Cu, Al—Si, Al—Mg, Al—Cu—Ni—Mg, Al—Si—Cu—Ni—Mg alloys, high tensile aluminum alloy and corrosion resistant aluminum alloy.

Also as the iron-based metals, there can be used pure iron, iron oxide, carbon steel, Ni steel, Cr steel, Ni—Cr steel, Cr—Mo steel, Ni—Cr—Mo steel, stainless steel, silicon steel, Permalloy, non-magnetic steel, magnet steel, cast iron, etc.

Also the fluorine-containing polymer can be adhered to a metallic substrate which was subjected to, for the purpose of preventing corrosion of metal, coating of other metal by electroplating, hot dipping, chromatizing, siliconizing, colorizing, sheradizing, metal spraying, etc.; forming a phosphate film by phosphatization; forming metal oxide by anodizing or heat-oxidizing; or electrochemical corrosion prevention.

Further for the purpose of enhancing adhesion, the surface of metallic substrate may be subjected to chemical preparation with a phosphoric acid, sulfuric acid, chromic acid, oxalic acid, etc., or may be subjected to surface roughening by sand blasting, shot blasting, grit blasting, honing, paper scratching, wire scratching, hair line finishing, etc. For the purpose of exhibiting clear surface pattern of the substrate, the metal surface may be subjected to coloring, printing, etching, etc.

In case of the above-mentioned aluminum or aluminum alloy substrate, in order to enhance corrosion resistance, surface hardness and adhesive property of the substrate, it is possible to form an oxide film (alumite) on the substrate by anodizing with caustic soda, oxalic acid, sulfuric acid or chromic acid and also use the aluminum or aluminum alloy substrate subjected to other surface treatments mentioned above.

Further there may be used a substrate plated, on its surface, with other metal as mentioned above, for example, steel plate subjected to hot-dip zinc-plating, hot-dip zinc alloy plating, aluminum plating, zinc-nickel plating, zinc-aluminum plating, or the like; a substrate coated with other metal by diffusion coating or thermal spraying; a substrate, on which an oxide film is formed by chemical conversion treatment with chromic acid or phosphoric acid or heat-treatment; a substrate subjected to electric corrosion preventing treatment (for example, galvanized steel plate); or the like.

With respect to the synthetic resin substrate, a resin solely or a resin containing at least one inorganic or organic filler which is effective for the purpose to enhance mechanical properties, surface hardness, hardness at heating and thermal stability (thermal deformation) can be used. Examples of preferred filler are those to be added to the layer (C) explained hereinafter.

In the structural member of the present invention, in order to secure the above-mentioned adhesive strength at high temperature between the fluorine-containing polymer layer (A) and the substrate (B), it is preferable that the layer (A) comprises only the fluorine-containing polymer substantially and does not contain a heat resistant engineering plastic to be usually added as an adhesive material. By mixing other material than the fluorine-containing polymer, even if an adhesive strength at room temperature can be improved, an adhesive strength at high temperature is lowered by lowering of a mechanical strength of the layer (A) itself in case where miscibility between the fluorine-containing polymer and the adhesive material (heat resistant engineering plastic, etc.) is poor. The mechanical strength of the layer (A) is preferably not less than 4.90 N/mm² (50 kgf/cm²) at 150° C., more preferably not less than 9.81 N/mm² (100 kgf/cm²) at 150° C., further preferably not less than 4.90 N/mm² (50 kgf/cm²) at 200° C.

Also when other adhesive material is mixed to the fluorine-containing polymer layer (A), heat resistance is lowered, and therefore in case of long term exposure at high temperature, the layer is deteriorated and durability of adhesion is lowered.

In the structural member of the present invention, the above-mentioned fluorine-containing polymer layer (A) is adhered directly to the substrate (B) without using an adhesive layer of binder, etc.

The binder layer itself comprising other material than the fluorine-containing polymer is insufficient in heat resistance and even when a binder having heat resistance is found out, adhesive strength between the fluorine-containing polymer layer (A) and the binder layer, particularly adhesive strength at high temperature is insufficient. Therefore a structural member like the structural member of the present invention comprising the fluorine-containing polymer strongly adhered to the substrate and having durability even at high temperature cannot be obtained.

For directly adhering the fluorine-containing polymer layer (A) to the substrate (B) to give good adhesive strength even at high temperature, it is preferable to introduce a functional group contributing to adhesion to the substrate into a molecular structure of the fluorine-containing polymer of the layer (A).

Examples of the preferable functional group contributing to adhesion to the substrate are hydroxyl group, carboxyl group, carboxylic acid salt, sulfonic acid group, sulfonic acid salt, epoxy group, cyano group, and the like. It is preferable that at least one of them is introduced in a molecular end or side chain of the fluorine-containing polymer. Among them, hydroxyl group is preferable from the viewpoint of having good heat resistance and being capable of directly adhering to the substrate strongly without lowering reflectance.

It is preferable that the fluorine-containing polymer having functional group is a fluorine-containing polymer prepared by copolymerizing (a) 0.05 to 50% by mole of at least one ethylenic monomer having any of the above-mentioned functional groups with (b) 50 to 99.95% by mole of a fluorine-containing ethylenic monomer having no functional group mentioned above.

It is preferable that the above-mentioned ethylenic monomer (a) is at least one of the fluorine-containing ethylenic monomers having any of the above-mentioned functional groups from the viewpoint of not lowering heat resistance, friction property, non-sticking property and adhesive property to the substrate of the fluorine-containing polymer layer.

It is preferable that the fluorine-containing ethylenic monomer (a) having functional group which is one of components constituting the fluorine-containing ethylenic polymer (fluorine-containing ethylenic polymer having functional group) is a fluorine-containing ethylenic monomer having functional group and represented by the formula (2):

wherein Y is —CH₂OH, —COOH, a carboxylic acid salt, —SO₃H, sulfonic acid salt, epoxy group or —CN, X and X¹ are the same or different and each is hydrogen atom or fluorine atom, $R_f^2$ is a divalent fluorine-containing alkylene group having 1 to 40 carbon atoms, a fluorine-containing oxyalkylene group having 1 to 40 carbon atoms, a fluorine-containing alkylene group having ether bond and 1 to 40 carbon atoms or a fluorine-containing oxyalkylene group having ether bond and 1 to 40 carbon atoms.

Examples of the fluorine-containing ethylenic monomer (a) having functional group are one represented by the formula (3):

$$CF_2=CF—R_f^3—Y \quad (3)$$

wherein Y is as defined in the above formula (2), $R_f^3$ is a divalent fluorine-containing alkylene group having 1 to 40 carbon atoms or $OR_f^4$, in which $R_f^4$ is a divalent fluorine-containing alkylene group having 1 to 40 carbon atoms or a divalent fluorine-containing alkylene group having ether bond and 1 to 40 carbon atoms, one represented by the formula (4):

$$CF_2=CFCF_2—OR_f^5—Y \quad (4)$$

wherein Y is as defined in the above formula (2), $R_f^5$ is a divalent fluorine-containing alkylene group having 1 to 39 carbon atoms or a divalent fluorine-containing alkylene group having ether bond and 1 to 39 carbon atoms, one represented by the formula (5):

$$CH_2=CFCF_2—R_f^6—Y \quad (5)$$

wherein Y is as defined in the above formula (2), $R_f^6$ is a divalent fluorine-containing alkylene group having 1 to 39 carbon atoms or $OR_f^7$, in which $R_f^7$ is divalent fluorine-containing alkylene group having 1 to 39 carbon atoms or a divalent fluorine-containing alkylene group having ether bond and 1 to 39 carbon atoms, one represented by the formula (6):

$$CF_2=CH—R_f^8—Y \quad (6)$$

wherein Y is as defined in the above formula (2), $R_f^8$ is a divalent fluorine-containing alkylene group having 1 to 40 carbon atoms, and the like monomer.

From the viewpoint that copolymerizability with the fluorine-containing ethylenic monomer (b) having no functional group mentioned above is comparatively good and that heat resistance of the obtained polymer is not lowered remarkably, the fluorine-containing ethylenic monomers having functional group and represented by the formulae (3) to (6) are preferable.

Among them, from the viewpoint of copolymerizability with the fluorine-containing ethylenic monomer (b) having no functional group mentioned above and heat resistance of the obtained polymer, the compounds of the formulae (3) and (5) are preferable, and the compound of the formula (5) is particularly preferable.

Examples of the fluorine-containing ethylenic monomer having functional group and represented by the formula (3) are:

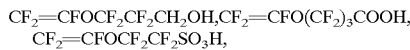

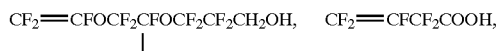

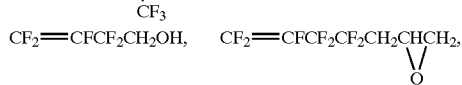

-continued

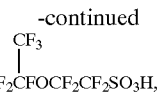

and the like.

Examples of the fluorine-containing ethylenic monomer having functional group and represented by the formula (4) are:

and the like.

Examples of the fluorine-containing ethylenic monomer having functional group and represented by the formula (5) are:

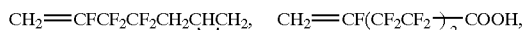

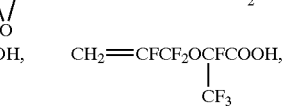

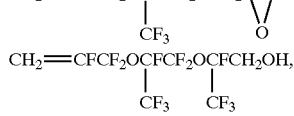

and the like.

Examples of the fluorine-containing ethylenic monomer having functional group and represented by the formula (6) are:

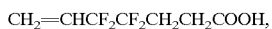

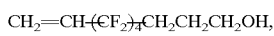

and the like.

In addition, there are

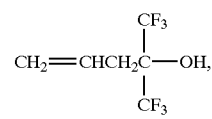

and the like.

A content of the fluorine-containing ethylenic monomer (a) having functional group in the fluorine-containing ethylenic polymer having functional group is from 0.05 to 50% by mole on the basis of the total amount of monomers in the polymer. The content of the monomer (a) is optionally selected depending on kind, shape, coating method, conditions, purposes and applications of the surface of a substrate to be used on the structural member. The content of the fluorine-containing ethylenic monomer (a) having functional group is preferably from 0.05 to 20% by mole, particularly preferably 0.1 to 10% by mole.

When the content of the monomer (a) is too low, sufficient adhesion to the substrate surface is difficult to obtain, and separation easily occurs due to temperature change and permeation of chemicals. When the content is too high, heat resistance is lowered and there occur adhesion failure, coloring, foaming and pin hole at sintering at high temperature or during use at high temperature, thus easily lowering reflection efficiency of heat energy and causing separation of a fluorine-containing polymer layer and elution due to decomposition.

The fluorine-containing ethylenic monomer (b) having no functional group mentioned above which is copolymerized with the luorine-containing ethylenic monomer (a) having functional group is ptionally selected from known monomers and gives the polymer heat esistance, friction property, chemical resistance, non-sticking property and stain-proofing property.

Examples of the fluorine-containing ethylenic monomer (b) are tetrafluoroethylene, a monomer represented by the formula (1): $CF_2=CFR_f$, wherein $R_f$ is $CF_3$ or $OR_f^1$, in which $R_f^1$ is a perfluoroalkyl group having 1 to 5 carbon atoms, chlorotrifluoroethylene, vinylidene fluoride, vinyl fluoride, hexafluoroisobutene,

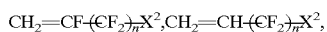

wherein $X^2$ are selected from hydrogen atom, chlorine atom and fluorine atom, n is an integer of 1 to 5, and the like.

In addition to the fluorine-containing ethylenic monomer (a) having functional group and the fluorine-containing ethylenic monomer (b) having no functional group mentioned above, an ethylenic monomer having no fluorine atom may be copolymerized in the range not lowering heat resistance and non-sticking property. In that case, it is preferable that the ethylenic monomer having no fluorine atom is selected from ethylenic monomers having not more than 5 carbon atoms in order not to lower heat resistance. Examples of such an ethylenic monomer are ethylene, propylene, 1-butene, 2-butene, and the like.

The fluorine-containing monomer (b) can be selected from those exemplified above so as to satisfy heat resistance and melting point of the fluorine-containing polymer to be used on the structural member of the present invention. Particularly it is preferable that the fluorine-containing monomer (b) is selected and copolymerized with the monomer (a) so that the monomer components excluding the monomer (a) are those of the above-mentioned (I) PTFE, modified PTFE; (II) perfluoro copolymers represented by PFA and FEP; and (III) ETFE. Thus in addition to the above-mentioned excellent properties of the fluorine-containing polymers such as (I) to (III), an adhesive property (at high temperature) to the substrate can be imparted.

The fluorine-containing polymers to be used on the structural member of the present invention can be prepared by (co)polymerizing the monomers constituting the polymer through known polymerization methods. Among them, radical copolymerization method is mainly used. Namely means for initiating the polymerization is not particularly limited if the polymerization advances radically. For example, the polymerization is initiated by an organic or inorganic radical polymerization initiator, heat, light, ionizing radiation, etc. The polymerization can be carried out by solution polymerization, bulk polymerization, suspension polymerization, emulsion polymerization, or the like. A molecular weight of the polymer is regulated by a concentration of the monomers used in the polymerization, a concentration of the initiator, a concentration of a chain transfer agent and polymerization temperature. Amounts of components of the prepared copolymer can be regulated by amounts of monomers used.

In the present invention, in order to obtain the structural member by adhering the fluorine-containing polymer layer (A) to the substrate (B), it is preferable that the fluorine-containing polymer, preferably the above-mentioned fluorine-containing polymer having adhesive functional group is previously made into the form of a coating (or a surface treating agent), film (or sheet), tube or other molded article and applied to a substrate.

In the present invention, when applied in the form of a coating to a substrate, the above-mentioned fluorine-containing polymer (preferably fluorine-containing polymer having functional group) is capable of being in the form of aqueous dispersion, organic solvent dispersion, powder (including granulate), organosol or an aqueous emulsion of organosol. Among them, from environmental and safety points of view, it is preferable to apply in the form of an aqueous dispersion or powder (powder coating).

The aqueous dispersion for fluorine-containing coating composition which is preferably used to obtain the structural member of the present invention is prepared by dispersing, in water, particles of the above-mentioned fluorine-containing ethylenic polymer having functional group. By introducing a functional group in the fluorine-containing polymer, dispersion stability of fine particles in the aqueous dispersion is enhanced and a coating composition having good storage stability can be obtained, and further leveling property, heat resistance and adhesive property at high temperature after coating are enhanced.

As the fluorine-containing ethylenic polymer having functional group, from the viewpoint of sliding property, non-sticking property, heat resistance and stain-proofing property in addition to adhesive property at high temperature, (I) PTFE having functional group is preferred, and from the viewpoint of heat resistance, transparency and non-sticking property, (II) PFA having functional group or FEP having functional group is preferred.

The above-mentioned aqueous dispersion is preferably a composition in a state of 0.01 to 1.0 μm fine particles of the polymer being dispersed in water. Usually a surfactant may be blended in the aqueous dispersion for the purpose of dispersion stability. Also to the aqueous dispersion can be added additives to be used usually such as pigment, surfactant, anti-foaming agent, viscosity control agent and leveling agent in amounts not lowering sliding property, non-sticking property, heat resistance and adhesive property.

The aqueous dispersion for fluorine-containing coating composition can be prepared through various methods. Examples of the method are, for instance, a method wherein a powder of the fluorine-containing polymer having functional group and prepared by suspension polymerization is finely pulverized and then the pulverized powder is dispersed homogeneously into an aqueous dispersion medium with a surfactant, a method wherein a fluorine-containing aqueous dispersion is prepared at the same time as emulsion polymerization and further a surfactant and additives are added as case demands, and the like methods. From the viewpoint of productivity and quality (for making particle size smaller and more uniform), a method of preparing an aqueous dispersion directly by emulsion polymerization is preferred.

A concentration of the polymer in the aqueous dispersion varies depending on intended coating thickness, concentration and viscosity of a coating composition, coating method, etc., and may be usually selected in the range of from about 5% by weight to about 70% by weight.

The coating method is not limited particularly. The coating may be carried out by brush coating, spray coating, roll coating or the like, followed by drying and then sintering at a temperature of not less than the melting point of the polymer and not more than its degradation temperature depending on kind of the polymer.

The coating thickness may be selected optionally depending on application, purpose, substrate, etc. For example, the coating thickness is from about 5 μm to about 200 μm, preferably from 10 to 100 μm.

The powder coating composition to be used preferably in order to obtain the structural member of the present invention comprises a powder of the above-mentioned fluorine-containing ethylenic polymer having functional group.

Further from the viewpoint of sliding property, heat resistance, corrosion resistance, chemical resistance and non-sticking property in addition to adhesive property at high temperature, the PFA or FEP (II) having functional group is preferred, and from the viewpoint of non-sticking property, processability and transparency, the ETFE (III) having functional group is preferred.

As the fluorine-containing powder coating composition, there can be used preferably one in the form of powder or in the granular form having a particle size of 10 to 1,000 μm and an apparent density of 300 to 1,200 kg/m$^3$ (0.3 to 1.2 g/cc).

To the fluorine-containing powder coating composition can be added optionally additives in an amount not lowering remarkably characteristics such as adhesive property, sliding property, non-sticking property and heat resistance of the fluorine-containing resin. Examples of the additives are, for instance, pigments such as carbon powder, titanium oxide and cobalt oxide; reinforcing agents such as glass fiber powder, carbon fiber powder and mica; amine anti-oxidant; organic sulfur compound; organotin anti-oxidant; phenolic anti-oxidant; thermal stabilizer such as metal soap; leveling agent; anti-static agent; and the like.

The fluorine-containing powder coating composition and the additives may be admixed in the form of powder (dry method) or in the form of slurry (wet method), and the mixing in the form of powder is preferred. As the mixing equipment, there can be used a conventional mixer or pulverizer, for example, a sand mill, V blender, ribbon blender or the like.

The fluorine-containing powder coating composition is generally coated by electrostatic spray coating, fluid-bed dip coating, rotolining, etc., and then sintered at a temperature of not less than the melting point of the polymer and not more than its degradation temperature depending on kind of the polymer, and thus a good coating film can be formed.

In general in case of electrostatic powder spray coating, a coating film having a thickness of 10 to 200 μm is formed, and in case of rotolining, a coating film having a thickness of 200 to 1,000 μm is formed.

The structural member of the present invention can be produced also by applying the fluorine-containing polymer (A) in the form of film to the substrate (B).

The preferred fluorine-containing polymer film which is used for producing the structural member of the present invention is preferably a film produced by molding the above-mentioned fluorine-containing ethylenic polymer having functional group. The film can be adhered to various substrates without surface treating and using usual adhesives, thereby giving excellent characteristics of a fluorine-containing polymer to a substrate.

As a result, merits of applying in the form of a film are as follows.

① A film comprising a fluorine-containing ethylenic polymer having functional group is advantageous from the viewpoint of processing since an applicator necessary for hot melt adhesive is not required, and the film can be adhered by thermocompression bonding while being put on a substrate or inserted between substrates.

② Further since a uniform adhesive layer is formed on the whole surface of substrate, a film free from non-uniform adhesion and having uniform adhesive strength can be obtained, and thus can be also applied to a substrate having poor compatibility or no compatibility therewith.

③ Further the film can be cut into various shapes, and thus is advantageous from the viewpoint of a small loss in processing work, good working environment and cost.

Though it is possible to produce adhesive films from the above-mentioned fluorine-containing polymers having functional group depending on application, purpose, shape of parts, environment at use, film production process and adhering method, preferable is the above-mentioned copolymer (II) (PFA having functional group or FEP having functional group) or copolymer (III) (ETFE having functional group) since the adhesive film itself has sliding properties, non-sticking property, heat resistance, chemical resistance and mechanical properties in addition to an adhesive property at high temperature; efficient film molding represented by melt-molding can be carried out; the film has good moldability; making the film thin and uniform is possible; and it is possible to melt the film by various thermocompression bonding methods to adhere strongly and beautifully to various substrates. Particularly preferred functional group is hydroxyl from the viewpoint of heat resistance.

A thickness of the fluorine-containing polymer film is selected depending on application, purpose and conditions at use and is not limited particularly. The thickness is from 5 to 3,000 μm, preferably 10 to 500 μm, particularly preferably 20 to 300 μm.

In case of too thin films, a special production method is required; it is difficult to handle the film at the time of adhering, and wrinkling, breaking and poor appearance occur easily; and there is a case where mechanical strength, chemical resistance and weather resistance become insufficient. Too thick film is disadvantageous from the viewpoint of cost and workability at the time of bonding to one unit.

To the film of fluorine-containing polymer having functional group can be optionally incorporated proper additives such as a reinforcing agent, filler, stabilizer, ultraviolet ray absorber, pigment, etc. in an amount not lowering adhesive property at high temperature and other characteristics of the film. Those additives make it possible to improve thermal stability, surface hardness, abrasion resistance, weather resistance and electrostatic charge, etc.

The fluorine-containing polymer film of the present invention can be produced, depending on kind of polymers used and desired shape of the film, by various methods such as thermal melting method, extrusion method, cutting method and solvent-casting method and a method of applying a powder or an aqueous dispersion or organic solvent dispersion to form a continuous coating film.

For example, a polymer which comprises the above-mentioned PTFE having functional group and is difficult to be melt-molded can be formed into a sheet by compression molding and then mechanical processing by cutting, etc., or directly formed into a sheet by extrusion molding (ram extrusion, paste extrusion, roll press, etc.). A melt-moldable polymer such as PFA, FEP or ETFE having functional group is molded by compression molding and extrusion molding, and melt-extrusion molding is particularly preferred from the viewpoint of productivity and product quality.

Adhesion of the film of fluorine-containing polymer having functional group to a substrate is achieved through thermal activation by heating, etc. Further thermo-melting adhesion by heating at a temperature of not less than a melting point thereof is preferable. Represented examples of the adhering method are heating roller method and heat press method. Also there are other methods such as high-frequency heating, microwave heating, vacuum compression (vacuum press, etc.) and pneumatic press. Those methods can be optionally selected depending on kind and shape of a substrate, condition and kind of film, etc.

In order to obtain the structural member of the present invention, the fluorine-containing polymer (A) can be applied on the substrate (B) in the form of tube or molded article in addition to the form of coating and film. The form is selected depending on a shape of the structural member.

For example, in case of the structural member in the tubular form like a cylinder, it is preferable that the fluorine-containing polymer (A) molded into the form of tube is adhered to an inner surface or outer surface of the tubular substrate.

With respect to kind, molding method and adhering method to the substrate (B) of the fluorine-containing polymer to be used in the form of tube, those for the above-mentioned film are used preferably.

A shape, thickness, etc. are optionally selected depending on application and purpose.

In the structural member of the present invention, a filler may be added to the fluorine-containing polymer layer (A) in a range not lowering heat resistance and adhesive strength, particularly adhesive strength at high temperature. The filler is added to improve abrasion resistance, mechanical properties and thermal deformation of the layer (A) but not to impart adhesive property.

Examples of the filler to be added preferably are those to be added to the layer (C) explained hereinafter.

The second structural member of the present invention is a three-layered structural member produced by laminating a layer (C) comprising a material different from that of the layer (A) on the layer (A) of the above-mentioned structural member which has an adhesive strength at high temperature and is produced by directly adhering: (A) the layer comprising the fluorine-containing polymer and substantially containing no adhesive material other than the fluorine-containing polymer to (B) the substrate.

The layer (C) can be selected from a metallic material, glass material, inorganic material, resin material and other various materials depending on application and purpose. In the structural member of the present invention, the substrate (B) and the layer (C) can be held with good adhesive strength through the fluorine-containing polymer layer (A) even at high temperature, and characteristics of the surface of the layer (C) can be maintained with good durability.

It is preferable that the material to be used on the layer (C) is selected from fluorine-containing polymers having a high heat resistance and low refractive index and being excellent in non-sticking property, friction property, weather resistance, chemical resistance and water repellency or from synthetic resins having heat resistance, abrasion resistance, mechanical strength and surface hardness equivalent to or higher than those of the fluorine-containing polymer layer (A). Thereby the above-mentioned excellent characteristics can be imparted to the surface of the structural member together with good heat resistance and durability.

The fluorine-containing polymer to be used preferably on the layer (C) of the three-layered structural member of the present invention is preferably selected from (III) ETFE in addition to (I) PTFE and modified PTFE and (II) PFA and FEP which comprise 0 to 100% by mole of TFE and 0 to 15% by mole of monomer of the formula (1) depending on application and purpose for the same reasons mentioned above.

Examples of the synthetic resin to be used preferably on the layer (C) are thermosetting resins such as polyimide, phenolic resin and COPNA resin, heat resistant engineering plastics such as aromatic polyester, PPS, PEEK, PES, PAI, PEI and thermoplastic PI, and the like.

The resin is selected from those resins depending on application and purpose. Those resins are preferable for the same reasons mentioned above.

Particularly in case of using a polyimide resin, a mechanical strength of the polyimide resin and excellent characteristics such as non-sticking property, etc. of the fluorine-containing polymer can be used together effectively by adhesive strength at high temperature of the fluorine-containing polymer layer (A).

Like the above-mentioned synthetic resin substrate, a filler can be contained in those synthetic resins depending on purpose.

Particularly when the structural member of the present invention is used for sliding application, it is preferable that the above-mentioned fluorine-containing polymers (I) to (III) are used as the layer (C) and further an inorganic or organic filler being effective for enhancing mechanical properties, abrasion resistance, surface hardness, hardness at heating and thermal stability (thermal deformation) of the fluorine-containing polymer is incorporated to the fluorine-containing polymer layer (C).

Thereby excellent sliding properties can be imparted to the surface of the structural member, and a sliding member being excellent in heat resistance and durability can be produced by using the structural member.

Examples of the filler to be mixed for the purpose of improving abrasion resistance, etc. are:

metals and metal fibers represented by stainless steel, iron, nickel, lead, copper, gold, silver, aluminum, molybdenum, rare earth cobalt and boron fiber;

carbons represented by carbon black, graphite, carbon fiber, activated carbon, hollow carbon beads and coke;

oxides represented by silica, alumina, titanium oxide, iron oxide, zinc oxide, magnesium oxide, tin oxide, antimony oxide, and the like;

hydroxides such as aluminum hydroxide and magnesium hydroxide;

carbonates such as calcium carbonate, magnesium carbonate and zinc carbonate;

sulfates such as calcium sulfate, gypsum fiber, barium sulfate, magnesium sulfate and MOS (basic magnesium sulfate in the form of fiber);

silicates represented by glass, hollow glass beads, glass fiber, glass powder, glass beads, talc, mica, kaoline, calcium silicate, wollastonite, xonotlite, PMF (a kind of slag fiber which is a mixture of alumino-silicate calcium and MgO), and the like;

borates such as aluminum borate, magnesium borate and calcium borate;

titanates such as potassium titanate and barium titanate;

nitrides such as aluminum nitride and silicon nitride;

carbides such as silicon carbide and titanium carbide;

sulfides such as molybdenum disulfide, molybdenum trisulfide, tungsten disulfide, zinc sulfide and cadmium sulfide;

phosphates such as calcium phosphate and iron phosphate; ferrites such as barium ferrite, calcium ferrite and strontium ferrite; and the like.

Those inorganic fillers are in the form of fiber, whisker, needle, powder, granule, bead, and the like.

Organic fillers are selected from those other than fluorine-containing polymers. Examples of an organic filler are organic fibers such as aramid fiber, polyalylate fiber and phenolic fiber; thermosetting resins such as polyimide, phenolic resin and COPNA resin; heat resistant engineering plastics such as aromatic polyester, PPS, PEEK, PES, PAI and PEI; and the like.

Among them, preferred are carbon fibers being capable of remarkably enhancing mechanical properties (particularly strength and modulus of elasticity), dimensional stability and abrasion resistance and giving electric conductivity, glass fillers maintaining insulating property and enabling mechanical properties, dimensional stability and abrasion resistance to be remarkably enhanced, whiskers maintaining flexibility and sealing property of a fluorine-containing resin, giving a molded article having surface smoothness and enabling mechanical strength, dimensional stability and abrasion resistance to be improved, inorganic fillers having cleavage property and self-lubricity, thus giving lubricity to a composition and molded article and lowering a friction coefficient, and organic fibers which have a low hardness and a property of being hard to injure a counterpart material (soft metal, etc.) on a sliding surface particularly when the composition is used as a sliding part and can give mechanical properties, dimensional stability and abrasion resistance to a molded article.

Among the above-mentioned glass fillers, glass fiber, glass beads, glass powder and hollow glass beads are preferable, and particularly glass fiber is preferable from the viewpoint of enhancement of mechanical properties and abrasion resistance.

Whiskers are single crystal substances in the form of needle, particularly those having a single crystal having a cross-sectional area of not more than $8 \times 10^{-5}$ in$^2$ and a length ten or more times an average diameter of the cross section. Those whiskers are discriminated from a polycrystalline continuous fiber.

Examples of the above-mentioned whiskers are silicon carbide whisker, silicon nitride whisker, potassium titanate whisker, aluminum borate whisker, zinc oxide whisker, basic magnesium sulfate whisker, graphite whisker, magnesium oxide whisker, magnesium borate whisker, titanium diboride whisker, calcium sulfate whisker, and the like.

In the present invention, fillers having cleavage property mean fillers having self-lubricity and being capable of giving lubricity to a molded article. Examples of the fillers having cleavage property are laminar crystalline substances such as graphite, molybdenum disulfide, tungsten disulfide, boron nitride having hexagonal system, talc and mica, and preferable are graphite and molybdenum disulfide.

Examples of the organic fiber are aramid fiber, polyalylate fiber, phenolic fiber, and the like, and among them, aramid fiber is preferable.

In the three-layered structural member of the present invention, a mixing ratio of the fluorine-containing polymer or heat resistant engineering plastic (C-1) to the filler (C-2) in the layer (C) can be selected optionally depending on kind of a filler, a degree of effect of addition thereof, purpose and application. Amounts of (C-1) and (C-2) are 30 to 99% by volume and 1 to 70% by volume, respectively, preferably 50 to 98% by volume and 2 to 50% by volume, respectively. When an amount of the filler is too small, a sufficient effect of improving abrasion resistance is difficult to obtain. When the amount is too large, it is difficult to exhibit excellent characteristics such as friction property and non-sticking property in case of the fluorine-containing polymer, and mechanical properties are lowered in case of the engineering plastic.

In order to produce the structural member comprising three layers by using the layer (C) of a fluorine-containing polymer or a mixture of a fluorine-containing polymer and a filler, a preferable fluorine-containing polymer of the layer (A) interposed between the substrate (B) and the layer (C) is one which has the same structure (monomer components) as the fluorine-containing polymer of the layer (C) and has a functional group being capable of imparting an adhesive property to the substrate (B) as mentioned above.

In that combination, compatibility of the fluorine-containing polymer of the layer (A) with the fluorine-containing polymer of the layer (C) to be overlaid thereon is good, and not only good adhesion between the layer (A) and the substrate (B) but also good intercoat adhesive strength between the layer (A) and the layer (C) can be obtained.

In order to obtain the structural member of the present invention comprising three layers by laminating the fluorine-containing polymer layer (A) and further the layer (C) comprising other material than that of the layer (A) on the substrate (B), the following methods can be employed.

i) A method of producing a structural member comprising the layer (A) and the substrate (B) previously and then laminating the layer (C) on the surface of layer (A).

ii) A method of laminating the layers (A) and (C) previously and then laminating the surface of the layer (A) to the substrate (B) by using the layer (A) as an adhesive layer.

iii) A method of carrying out adhesion of the layer (A) and the substrate (B) and lamination of the layer (A) and the layer (C) simultaneously.

Usually the methods i) and ii) are employed.

When the structural member comprising three layers is produced by the method i), the fluorine-containing polymer or the fluorine-containing polymer containing a filler which is used for the layer (C) is applied in the form of coating, film, tube or other molded article in the same manner as in adhering the layer (A) to the substrate (B).

When the structural member comprising three layers is produced by the method ii), lamination of the layers (A) and (C) can be carried out previously by a method of forming the both of the fluorine-containing polymer of the layer (A) and the fluorine-containing polymer of the layer (C) into film or tube and then laminating them by thermal activation, or the like in the form of laminated film or laminated tube, a method of forming the fluorine-containing polymer of the layer (C) into film, tube or other molded article and then applying the fluorine-containing polymer of the layer (A) in the form of coating on the surface of the layer (C) and sintering to give a form of laminated film, laminated tube or other molded article, a method of forming the fluorine-containing polymer of the layer (A) into film, tube or other molded article and then applying the fluorine-containing polymer of the layer (C) in the form of coating on the surface of the layer (A) and sintering to give a form of laminated film, laminated tube or other molded article, and a method of laminating the layers (A) and (C) by a spontaneous multi-layer molding method such as spontaneous multi-layer extrusion and spontaneous multi-layer blowing by using pellets or powder of the respective fluorine-containing polymers to be used in the layers (A) and (C).

After that, the substrate (B) and the layer (A) are subjected to bringing into contact with each other, heating and pressing, and thus a three-layered structural member can be obtained.

The two-layered structural member or three-layered structural member of the present invention, particularly the structural member having an outermost surface of the fluorine-containing polymer or the fluorine-containing polymer containing a filler can be used effectively as a sliding material or sliding member because of excellent properties of its surface such as friction property, abrasion resistance and heat resistance in addition to heat resistance and durability of the whole structural member.

Examples of the particularly preferable structural member for sliding application are as follows.

① A structural member which comprises:
- a substrate (B) selected from steel members such as carbon steel and stainless steel and metals such as cast iron, copper, nickel, aluminum and lead,
- a layer (A) of polymer selected from PFA having functional group, FEP having functional group and PTFE having functional group, and a layer (C) of PTFE or PFA prepared by mixing 1 to 40% by weight of carbon fiber.

The structural member characterized in that the layer (A) forms an adhesive layer between the substrate (B) and the layer (C) is preferable particularly from the viewpoint of excellent abrasion resistance, load resistance and post-processability such as bending resistance and is suitable for applications such as bearing, mechanical seal and bearing pad, particularly for application to automobiles.

② A structural member which comprises:
- a substrate (B) selected from metallic members such as aluminum, carbon steel and stainless steel and metals such as cast iron, nickel, copper and lead,
- a layer (A) of polymer selected from PFA having functional group, FEP having functional group and PTFE having functional group, and a layer (C) of PTFE or PFA prepared by mixing 1 to 30% by weight of glass fiber.

The structural member characterized in that the layer (A) forms an adhesive layer between the substrate (B) and the layer (C) is preferable from the viewpoint of excellent abrasion resistance, and is preferably used for bearing, gasket and valve disc.

③ A structural member which comprises:
- a substrate (B) selected from metallic members such as aluminum, carbon steel and stainless steel and metals such as cast iron, nickel, copper and lead,
- a layer (A) of polymer selected from PFA having functional group, FEP having functional group and PTFE having functional group, and
- a layer (C) of PTFE or PFA prepared by mixing 5 to 40% by weight of graphite.

The structural member characterized in that the layer (A) forms an adhesive layer between the substrate (B) and the layer (C) is preferable from the viewpoint of small initial abrasion and abrasion coefficient, good cold flow resistance, excellent thermal conductivity and further excellent chemical resistance.

④ A structural member which comprises:
- a substrate (B) selected from metallic members such as aluminum, carbon steel and stainless steel, steel plates and plated steel plates and metals such as cast iron, nickel, copper and lead,
- a layer (A) of polymer selected from PFA having functional group, FEP having functional group and PTFE having functional group, and
- a layer (C) of PTFE or PFA prepared by mixing 10 to 80% by weight of bronze.

The structural member characterized in that the layer (A) forms an adhesive layer between the substrate (B) and the layer (C) is preferable from the viewpoint of high hardness and excellent compressive strength and thermal conductivity and is suitable for bearing and gate bearing for bridge.

⑤ A structural member which comprises:
- a substrate (B) selected from metallic members such as aluminum, carbon steel and stainless steel and metals such as cast iron, nickel, copper and lead,
- a layer (A) of polymer selected from PFA having functional group, FEP having functional group and PTFE having functional group, and
- a layer (C) of PTFE or PFA prepared by mixing 1 to 40% by weight of aromatic polyester (completely aromatic polyester being non-meltable or having a high melting point).

The structural member characterized in that the layer (A) forms an adhesive layer between the substrate (B) and the layer (C) is preferable from the viewpoint of a property of being hard to injure a counterpart material even if the counterpart material is a soft metal and is suitable for bearing for soft metal.

⑥ A structural member which comprises:
- a substrate (B) selected from metallic members such as aluminum, carbon steel and stainless steel and metals such as cast iron, nickel, copper and lead,
- a layer (A) of polymer selected from PFA having functional group, FEP having functional group and PTFE having functional group, and a layer (C) of PTFE or PFA prepared by mixing 5 to 30% by weight of glass fiber and 1 to 10% by weight of graphite.

The structural member characterized in that the layer (A) forms an adhesive layer between the substrate (B) and the layer (C) is preferable from the viewpoint of excellent abrasion resistance and cold flow resistance and is preferably used for piston ring.

⑦ A structural member which comprises:
- a substrate (B) selected from metallic members such as aluminum, carbon steel and stainless steel and metals such as cast iron, nickel, copper and lead,
- a layer (A) of polymer selected from PFA having functional group, FEP having functional group and PTFE having functional group, and
- a layer (C) of PTFE or PFA prepared by mixing 5 to 30% by weight of glass fiber and 1 to 10% by weight of molybdenum disulfide.

The structural member characterized in that the layer (A) forms an adhesive layer between the substrate (B) and the layer (C) is preferable from the viewpoint of excellent abrasion resistance, cold flow resistance, high tensile strength and elongation and good insulating property and is suitable particularly for tape liner type bearing.

While sliding materials produced by molding a fluorine-containing resin only or a composition comprising a fluorine-containing resin and a filler have been insufficient in mechanical properties, creep strength and abrasion resistance, the sliding materials produced from the structural members ① to ⑦ are preferable because mechanical strength can be improved and the materials can be applied to large size sliding parts and also are preferable because the structural articles exemplified in ① to ⑦ can be easily obtained depending on application, purpose and kind of counterparts even in case of imparting sliding properties to a surface of a metallic substrate.

Further the structural member of the present invention is preferably used particularly as sliding material for application and parts for use at high temperature and application and parts subject to heating to high temperature because an adhesive strength between the substrate (B) and the fluorine-containing polymer layer (A) is high even at high temperature.

For example, the structural member of the present invention is preferable for use as bearings for engine of car or bearings to be used around engine of car. Examples of the application thereof are parts such as piston pin bush for car engine, half-split metal for car engine, pump bush for power steering, rack and pinion steering bush, thrust bearing for turbo charger, floating bearing for turbo charger, strut type shock absorber bush, starter bush, rocker arm roller pin, rocker arm bush and piston boss bush. Heat resistance and durability thereof are good and excellent sliding properties can be imparted to each part.

The structural member of the present invention can also be preferably used similarly for bearings for ships, aircraft, cars and high speed rotation machine which are used at high temperature.

Equipment, instruments, members, parts and portions thereof other than those mentioned above on which the structural members of the present invention can be used suitably for sliding application are classified by fields thereof and raised below concretely, but applications are not limited to them.

[1] OA-related Apparatus

OA-related apparatuses have parts requiring sliding properties because paper feeding speed are becoming higher. Non-restricted typical examples thereof are raised below.

① Separating claw and bearing for fusing roller (surface)

Substrate (B): Heat resistant resin-made substrate (for example, polyphenylene sulfide, polyamide imide, polyether imide, polyoxymethylene (POM), polyether ether ketone (PEEK) or the like)

Fluorine-containing polymer (A): PTFE having functional group or PFA or FEP having functional group Form of polymer to be applied: Coating When the structural member of the present invention is used, staining by a toner can be prevented, and a separating claw having excellent abrasion resistance, assuring easy paper feeding and hardly injuring a roller and a bearing for fusing roller having excellent friction property, abrasion resistance and heat resistance can be obtained. Since the fluorine-containing polymer having functional group has excellent adhesive property, no primer need be provided, and processability in production is excellent.

② Paper delivery roller and paper delivery guide

Substrate (B): Resin-made substrate (for example, polyphenylene sulfide, polyamide imide, polyether imide, POM, PEEK, or the like)

Fluorine-containing polymer (A): PTFE having functional group or PFA or FEP having functional group Form of polymer to be applied: Coating When the structural member of the present invention is used, staining by a toner can be prevented, and a paper delivery roller and paper delivery guide having excellent abrasion resistance can be obtained. Since the fluorine-containing polymer having functional group has excellent adhesive property, no primer need be provided, and processability in production is excellent.

③ Fixing belt

Substrate (B): Resin-made substrate (for example, polyimide, polyamide imide, polyether imide, PEEK, PES, or the like)

Fluorine-containing polymer (A): PTFE having functional group or PFA or FEP having functional group Form of polymer to be applied: Coating and film When the structural member of the present invention is used, staining by a toner can be prevented, and a fixing belt having excellent heat resistance and durability can be obtained. Since the fluorine-containing polymer having functional group has excellent adhesive property, no primer need be provided, and processability in production is excellent.

[2] Domestic Appliances

Domestic appliances also have portions (parts) requiring sliding properties such as abrasion resistance. Those parts of each domestic appliance are raised below, indicating effects to be exhibited in addition to sliding properties. Accordingly the present invention also relates to those parts and domestic appliances.

① Iron

Application: Heating surface

Substrate (B): SUS and steel plate

Fluorine-containing polymer (A): PTFE having functional group or PFA having functional group Form of polymer to be applied: Coating and film In this application, heat resistance, processability and a property for exhibiting clear surface pattern of the substrate which the structural member of the present invention has can be utilized particularly effectively.

[3] Housing Facilities and Equipment

Housing facilities and equipment also have portions (parts) requiring sliding properties such as abrasion resistance and friction resistance from the viewpoint of easy handling at use. Those housing facilities and equipment and parts thereof are raised below, indicating effects to be exhibited in addition to sliding properties. Accordingly the present invention also relates to those housing facilities and equipment and portions (parts) thereof.

① Escalator

Application: Surface of skirt (prevention from being caught in escalator)

Substrate (B): SUS and steel plate

Fluorine-containing polymer (A): PTFE having functional group or PFA or FEP having functional group Form of polymer to be applied: Coating and film In this application, processability, a property for exhibiting clear surface pattern of the substrate and weather resistance which the structural member of the present invention has can be utilized particularly effectively.

[4] Automobile

Automobiles have lots of potions (parts) such as engine and gear requiring heat resistance and chemical resistance.

① Rotary engine

Application: Inner surface

Substrate (B): Aluminum and steel plate

Fluorine-containing polymer (A): PTFE having functional group or PFA or FEP having functional group Form of polymer to be applied: Coating In this application, processability, heat resistance, non-sticking property and stain-proofing property which the structural member of the present invention has can be utilized particularly effectively.

② Piston and piston ring

Application: Surface

Substrate (B): Aluminum and steel plate

Fluorine-containing polymer (A): PTFE having functional group or PFA or FEP having functional group Form of polymer to be applied: Coating In this application, processability and heat resistance which the structural member of the present invention has can be utilized particularly effectively.

③ Throttle shaft

Application: Surface

Substrate (B): Aluminum and iron-based metal

Fluorine-containing polymer (A): PTFE having functional group or PFA or FEP having functional group Form of polymer to be applied: Coating In this application, processability and heat resistance which the structural member of the present invention has can be utilized particularly effectively.

In addition, the polymer can be applied in the form of coating on surfaces of steering, hinge pin, various gears, brake shoe, bearing retainer, and the like to impart sliding properties thereto.

[5] Civil Engineering, Building and Building Material

The structural member can be used for movable supports such as stanchion and foundation of a large size building structures such as building and bridge, particularly for applications requiring sliding properties in transportation at low speed at high load.

① Foundation of high level road and bridge beam

Application: Bearing pad

Substrate (B): Iron

Fluorine-containing polymer (A): PTFE having functional group or PFA or FEP having functional group Form of polymer to be applied: Coating and film In this application, by using a metallic substrate, durability particularly at high load is excellent and friction property and abrasion resistance can be utilized effectively.

② Seismic isolation of housing and building

Application: Foundation and guiding portion of column

Substrate (B): Iron and stainless steel

Fluorine-containing polymer (A): PTFE having functional group or PFA or FEP having functional group Form of polymer to be applied: Coating and film In this application, sliding properties and durability in transportation (vibration) at low speed at high load is excellent and the structural member can be utilized particularly effectively as measures for seismic isolation against earthquake and strong wind.

③ Support for piping of plant

Application: Contact surface of pipe and support for fixing the pipe

Substrate (B): Iron and stainless steel

Fluorine-containing polymer (A): PTFE having functional group or PFA or FEP having functional group Form of polymer to be applied: Coating and film In this application, the structural member is used for fixing metallic pipe preferably from the viewpoint of being adaptable to expansion and shrinkage of the pipe due to a change in atmospheric temperature and a temperature of fluid.

[6] Others

① Bolts and nuts

Application: Surface

Substrate (B): Iron

Fluorine-containing polymer (A): PTFE having functional group or PFA or FEP having functional group Form of polymer to be applied: Coating In this application, processability, rust preventive property, chemical resistance and workability at low torque which the structural member of the present invention has can be used effectively.

② Cutlery such as scissors, saw and kitchen knife

Application: Surface of blade

Substrate (B): Iron

Fluorine-containing polymer (A): PTFE having functional group or PFA or FEP having functional group Form of polymer to be applied: Coating In this application, non-sticking property, stain-proofing property, processability and cutting property at low load which the structural member of the present invention has can be used effectively.

③ Parts of pump

Application: Inner and outer surfaces of plunger and surface of gear

Substrate (B): Aluminum and iron

Fluorine-containing polymer (A): PTFE having functional group or PFA or FEP having functional group Form of polymer to be applied: Coating and film In this application, particularly chemical resistance, processability and abrasion resistance which the structural member of the present invention has can be used effectively.

④ Parts of air conditioner (car air conditioner, room air conditioner, etc)

Application: Piston ring

Substrate (B): Aluminum and iron

Fluorine-containing polymer (A): PITFE having functional group or PFA or FEP having functional group Form of polymer to be applied: Coating In this application, particularly processability and chemical resistance which the structural member of the present invention has can be used effectively.

Further the structural member can be used for parts of vending machine, parts of camera, parts of medical instruments (parts of gastrocamera, etc.), parts of clock, parts of agricultural machine, oil-less bearing for mechanical industry, etc.

⑤ Parts of motor

Application: Coil

Substrate (B): Copper

Fluorine-containing polymer (A): PTFE having functional group or PFA or FEP having functional group Form of polymer to be applied: Film In this application, coils having excellent friction property and insulating property which the structural member of the present invention has can be obtained, thereby preventing breakage due to vibration, preventing exposure of core wire when winding coils since the fluorine-containing polymer having functional group is excellent in adhesive property and giving excellent processability in production.

⑥ Wire, cable and flat cable

Application: Wire

Substrate (B): Polyimide

Fluorine-containing polymer (A): PTFE having functional group, PFA having functional group or FEP having functional group Form of polymer to be applied: Film and coating The structural member of the present invention can be used for heat resistant wire and heat resistant cable for aircraft which require excellent insulating property, adhesive property to polyimide and copper and particularly heat resistance which the structural member has. Also the structural member can be used for magnet wire and plenum cable of motors and inner wires of a large size computer.

⑦ The structural member of the present invention can be used partly for other applications such as plate type heating element, oxygen sensor, fuel batteries, condenser and electret by utilizing heat resistance of adhesive strength thereof.

Further heat resistant engineering plastic such as polyimide may be laminated as the layer (C).

The present invention is then explained below by means of examples and preparation examples, but is not limited to them.

PREPARATION EXAMPLE 1

Synthesis of PFA Having Hydroxyl

A 6-liter glass-lined autoclave equipped with a stirrer, valve, pressure gauge and thermometer was charged with 1,500 ml of pure water. After replacing with nitrogen gas sufficiently, the autoclave was evacuated and charged with 1,500 g of 1,2-dichloro-1,1,2,2-tetrafluoroethane (R-114).

Then 5.0 g of perfluoro-(1,1,9,9-tetrahydro-2,5-bistrifluoromethyl-3,6-dioxa-8-nonenol) (formula (7)):

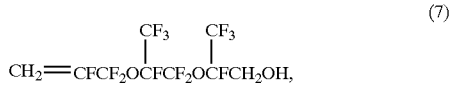

(7)

130 g of perfluoro(propyl vinyl ether) (PPVE) and 180 g of methanol were fed into the autoclave with pressurized nitrogen gas, and a temperature inside the system was maintained at 35° C.

Pressurized tetrafluoroethylene (TFE) gas was introduced into the autoclave with stirring so that the inside pressure of the autoclave became 0.78 MPa (8.0 kgf/cm$^2$G). Then 0.5 g of 50% methanol solution of di-n-propyl-peroxydicarbonate was fed into the autoclave with pressurized nitrogen gas to initiate a reaction.

Since the pressure lowered with the advance of the polymerization reaction, it was increased again to 0.78 MPa (8.0 kgf/cm$^2$G) by feeding tetrafluoroethylene gas at the time when it lowered to 0.74 MPa (7.5 kgf/cm$^2$G). Thus the decreasing and increasing of the pressure were repeated.

While continuing supply of tetrafluoroethylene, every time when about 60 g of tetrafluoroethylene gas was consumed after starting of the polymerization, 2.5 g of the above-mentioned fluorine-containing ethylenic monomer having hydroxyl (compound represented by the formula (7)) was introduced under pressure nine times (22.5 g in total) to continue the polymerization. At the time when about 600 g of tetrafluoroethylene gas was consumed after starting of the polymerization, the supplying thereof was terminated and the autoclave was cooled and the un-reacted monomer and R-114 were released.

After washed with water and methanol, the obtained copolymer was vacuum-dried to give 710 g of white solid. Components of the obtained copolymer and amounts thereof which were determined through $^{19}$F-NMR and IR analyses were TFE/PPVE/ Fluorine-containing ethylenic monomer having hydroxyl and represented by the formula (7))=97.0/2.0/1.0% by mole. In infrared spectrum, characteristic absorption of —OH was observed at 3,620 to 3,400 cm$^{-1}$. According to DSC analysis, Tm was 305° C., and according to DTGA analysis, 1% thermal degradation temperature Td was 375° C. A melt flow rate measured under conditions of preheating at 372° C. for five minutes at a load of 0.69 N/mm$^2$ (7 kgf/cm$^2$) by using Koka-type flow tester and nozzles of 2 mm diameter×8 mm length was 32 g/10 min.

PREPARATION EXAMPLE 2

Production of Film of PFA Having Hydroxyl by Extrusion

The white solid obtained in Preparation Example 1 was extruded at 350° to 370° C. by using a twin screw extruder (LABOPLASTOMIL available from Toyo Seiki Kabushiki Kaisha) to give pellets. The pellets were extruded at 360° to 380° C. at a roller temperature of 120° C. by using a single screw extruder to give a film of 40 cm wide×100 to 110 μm thick. Also a film of 50 to 55 μm thick was produced in the same manner as above.

EXAMPLE 1

Tensile Strength at High Temperature of PFA film (A) Having Hydroxyl

The 100 to 110 μm thick PFA film having hydroxyl which was produced in Preparation Example 2 was subjected to a tension test at each temperature by the following method. The results are shown in Table 1.

(1) Tension Test

A tensile strength was measured at a cross head speed of 0.1 m/min (100 mm/min) by using TENSILON universal tester available from Orientec Corporation according to ASTM D638.

TABLE 1

| Sample | Example 1<br>PFA film having hydroxyl |
|---|---|
| Tensile strength | |
| 25° C. | 33.0 MPa (337 kgf/cm$^2$) |
| 50° C. | 28.7 MPa (293 kgf/cm$^2$) |
| 100° C. | 21.5 MPa (219 kgf/cm$^2$) |
| 150° C. | 15.2 MPa (155 kgf/cm$^2$) |
| 200° C. | 9.6 MPa (98 kgf/cm$^2$) |

EXAMPLE 2

Adhesion Test at High Temperature of PFA Film (A) Having Hydroxyl and Metal (B))

Production of test piece and measurement of longitudinal shear strength were carried out according to the test method of tensile shear strength of an adhesive of JIS K6850.

① Pre-treatment of substrate

An adhering part (12.5 mm×25 mm) of carbon steel S45C of 100 mm (length d)×25 mm (width b)×1.5 mm (thickness e) was subjected to roughening treatment by sand blasting of emery sand #80 and #100 (50/50% by weight) at a spraying pressure of 0.98 MPa (10 kgf/cm$^2$G) to give a surface roughness of Rz 10 to 20 μm.

② Production of test piece

FIG. 1 shows a diagrammatic perspective view of a test piece for tensile shear strength test.

As shown in FIG. 1, the PFA film 1 having hydroxyl (length a of 12.5 mm, width b of 25 mm, thickness c of 100 μm) which was produced in Preparation Example 2 was put as an adhesive layer between the carbon steel substrates 2 (S45C), and a difference in a level was adjusted with a spacer. Then the film and substrates were set on a press machine of 350° C., followed by preheating (20 minutes) and compressing at 2.45 MPa (25 kg/cm$^2$) for one minute to give a structural member ①. Also a structural member ② was produced in the same manner as above except that the 50 μm thick film (length and width are the same as in the above-mentioned film) produced in Preparation Example 2 was used, a pressing temperature was set at 320° C. and for cooling to 300° C. after compressing for one minute, slow cooling for 30 minutes was carried out.

③ Adhesive strength

A longitudinal shear strength was measured at each temperature according to JIS K6850. The results are shown in Table 2.

TABLE 2

| Fluorine-containing polymer layer (A) Substrate (B) | Structural member 1̂ Fluorine-containing polymer having functional group Carbon steel | Structural member 2̂ Fluorine-containing polymer having functional group Carbon steel |
|---|---|---|
| Adhesive strength | | |
| 25° C. | 7.5 N/mm² (76.4 kgf/cm²) | 15.0 N/mm² (152.9 kgf/cm²) |
| 50° C. | 8.5 N/mm² (86.3 kgf/cm²) | — |
| 100° C. | 4.8 N/mm² (49.0 kgf/cm²) | 13.6 N/mm² (138.4 kgf/cm²) |
| 150° C. | 4.0 N/mm² (40.5 kgf/cm²) | 10.2 N/mm² (104.2 kgf/cm²) |
| 200° C. | 2.5 N/mm² (25.0 kgf/cm²) | 8.0 N/mm² (82.1 kgf/cm²) |

EXAMPLE 3

Heat Resistance of Adhesive Strength of Laminated Plate of PFA Film Having Hydroxyl (1) Production of Laminated Plate A pure aluminum plate subjected to pre-treatment by degreasing with acetone and then sand blast treatment was used as a substrate. The PFA film having hydroxyl produced in Preparation Example 2 (thickness: 100 μm), PFA film having no functional group (NEOFLON PFA Film AF-0100 available from DAIKIN INDUSTRIES, LTD.) (thickness: 100 μm) and polyimide film for releasing (KAPTON 200-H available from Du Pont) were cut to the same size as that of the substrate.

Figure 2:
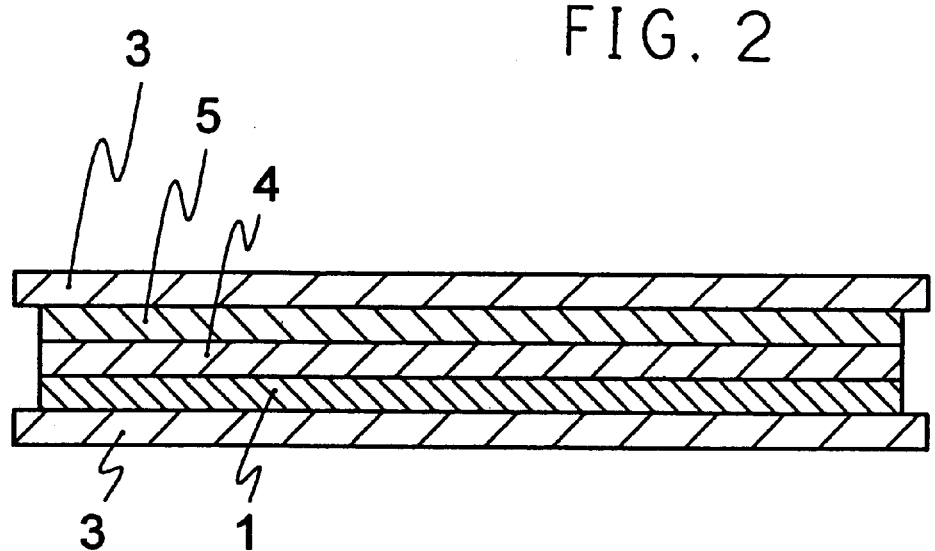
FIG. 2 is a diagrammatic cross-sectional view of a laminated test plate made in Example 3 of the present invention.
Figure 3:
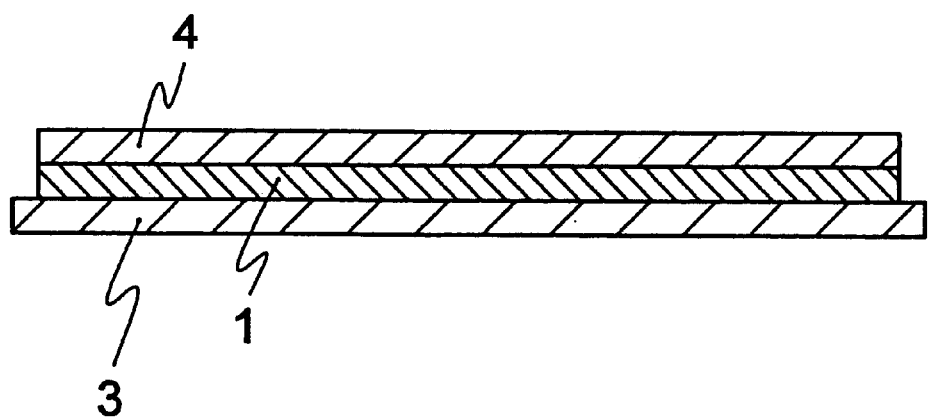
FIG. 3 is a diagrammatic cross-sectional view of a three-layered laminated article made in Example 3 of the present invention.

FIG. 2 is a diagrammatic cross-sectional view of a laminated test plate. As shown in FIG. 2, the above-mentioned PFA film 1 having hydroxyl, PFA film 4 having no functional group and polyimide film 5 were put between the two aluminum plates 3 (one is a substrate) and set on a press machine of 350° C., followed by preheating (20 minutes) and compressing at 4.9 MPa (50 kgf/cm²) for one minute. After cooling, the aluminum plate 3 contacting the polyimide film 5 and the polyimide film 5 were removed to give a three-layered laminated article comprising (A) the PFA film 1 having hydroxyl as an adhesive layer, (B) aluminum plate 3 and (C) PFA film 4. FIG. 3 is a diagrammatic cross-sectional view of the obtained three-layered laminated article.

(2) Adhesive Strength

Figure 4:
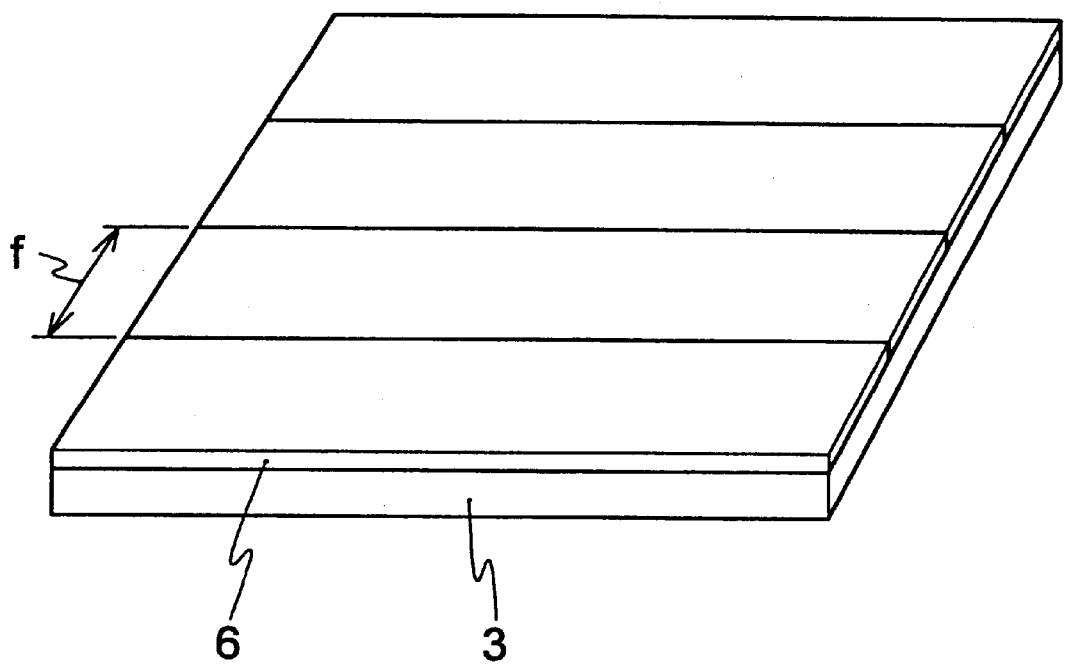
FIG. 4 is a diagrammatic perspective view of an aluminum plate having a coating film obtained in Example 3 of the present invention for measuring adhesive strength.
Figure 5:
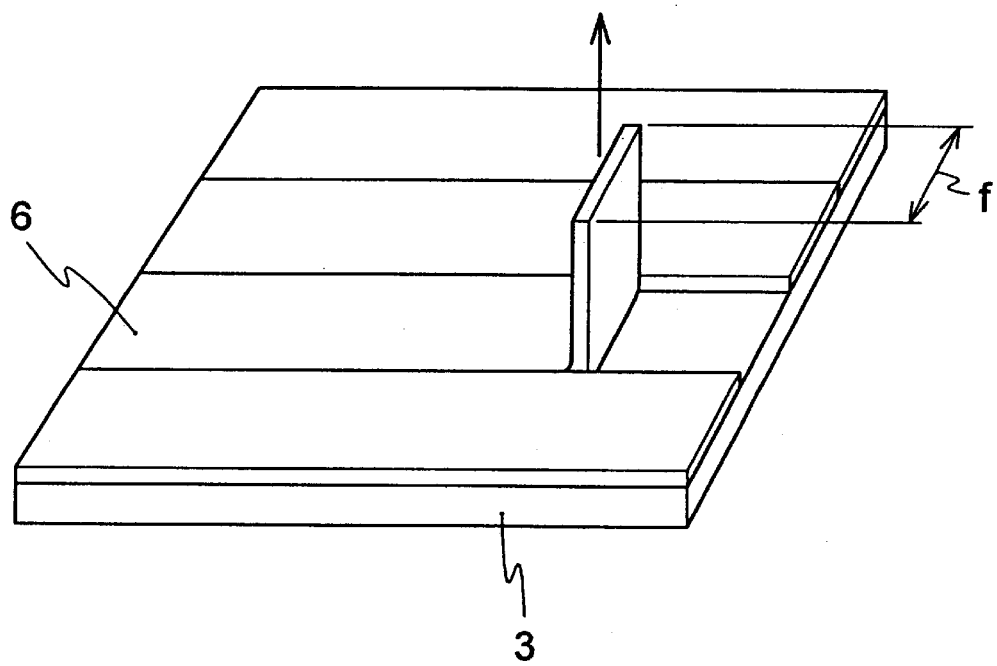
FIG. 5 is a diagrammatic perspective view of a test sample made for measuring adhesive strength in Example 3 of the present invention.

FIG. 4 is a diagrammatic perspective view of the aluminum plate 3 produced in above (1) and having fluorine-containing polymer layers of (A) and (C). As shown in FIG. 4, the composite layer 6 produced in the above (1) was notched with a cutter at intervals of width f (10 mm) so that the cut depth reached the substrate. One end of the strip-like layer 6 was torn up to make a test piece for measuring an adhesive strength. FIG. 5 shows a diagrammatic perspective view of the obtained test piece for measuring an adhesive strength.

As shown in FIG. 5, the layer 6 was pulled at an angle of 90 degrees to the aluminum plate 3 and a peeling strength was measured. The measurement was carried out at room temperature at a cross head speed of 0.05 m/min (50 mm/min) by using a TENSILON universal tester (same as in Example 1), and an average load at peeling measured by an area method was assumed to be an adhesive strength. The results are shown in Table 3.

(3) Measurement of Heat Resistance of Adhesive Strength

A laminated plate was produced separately in the same manner as in the above (1), and put in a hot air dryer set at 300° C. Then 200 hours later and 500 hours later, the coated plate was taken out of the dryer and cooled to room temperature. In respective cases, production of test piece and measurement of adhesive strength were carried out in the same manner as in the above (2). The results are shown in Table 3.

EXAMPLES 4 to 5

Heat Resistance of Adhesive Strength of Laminated Plate of PFA Having Hydroxyl Group Production of laminated plates and measurements of adhesive strength and heat resistance of adhesive strength were carried out in the same manner as in Example 3 except that a SUS430 steel late (Example 4) subjected to the same pre-treatment as in the luminum plate and a galvanized steel plate (Example 5) subjected to only degreasing were used, respectively instead of the aluminum plate. The results are shown in Table 3.

COMPARATIVE EXAMPLE 1

Heat Resistance of Adhesive Strength of Laminated Plate Produced by Using Surface-treated Fluorine-containing Resin Film (1) Surface Treatment of Fluorine-containing Resin Film One surface of a film of PFA having no functional group (NEOFLON PFA film AF-0100 available from DAIKIN INDUSTRIES, LTD.) (thickness: 100 μm) was surface-treated with TETRAETCH A (available from JUNKOSHA CO., LTD.) in a manner as mentioned below. One surface (adhering surface) of the PFA film was wiped with acetone, and after drying, the surface was coated with a TETRAETCH A solution. The TETRAETCH A solution was held on the film for about 20 seconds, followed by washing with methanol and pure water and drying. Also a wettability of a surface of the film was determined by using a 0.04 N/m (40 dyn/cm) standard solution according to the method specified in JIS K-6768. It was confirmed that the surface was uniformly wetted, which indicated the surface had been sufficiently surface-treated. A water contact angle of the treated surface was 61 degrees (110 degrees before treated).

(2) Production of Laminated Plate

An aluminum plate subjected to the same pre-treatment as in Example 3 was coated with a two-liquid type heat resistant epoxy adhesive (HITEMP HT-100L available from Kabushiki Kaisha Konishi). The PFA film surface-treated in the above (1) was cut to the same size as the substrate, and the treated side thereof was brought into close contact with the adhesive layer of the substrate, followed by heating at 120° C. for one hour and baking at 180° C. for twenty hours for curing to adhere them.

(3) Measurement of Adhesive Strength

A test piece for measuring an adhesive strength was produced by using the laminated plate produced in the above (2) instead of the laminated plate produced in Example 3 by notching at intervals of 10 mm width and tearing up one end of the strip-like film at an interface between the PFA film and the adhesive layer in the same manner as in (2) of Example 3. The adhesive strength was measured in the same manner as in (2) of Example 3 by pulling the torn film at an angle of 90 degrees to the substrate. The results are shown in Table 3.

(4) Measurement of Heat Resistance of Adhesive Strength

The same laminated plate as in the above (2) was produced separately, and by using it, the measurement was made in the same manner as in (3) of Example 3. The results are shown in Table 3.

COMPARATIVE EXAMPLES 2 to 3

Heat Resistance of Adhesive Strength of Laminated Plate Produced by Using Surface-treated Fluorine-containing Resin Film Production of laminated plates and measurements of adhesive strength and heat resistance of adhesive strength were carried out in the same manner as in Comparative Example 1 except that a SUS430 steel plate (Comparative Example 2) subjected to the same pre-treatment as in the aluminum plate and a galvanized steel plate (Comparative Example 3) subjected to only degreasing were used, respectively instead of the aluminum plate. The results are shown in Table 3.

COMPARATIVE EXAMPLE 4

Heat Resistance of Adhesive Strength of Laminated Plate Produced by Using Surface-treated Film (1) Surface Treatment of Fluorine-containing Resin Film A surface-treated FEP film (NEOFLON FEP film NF-0100B1 available from DAIKIN INDUSTRIES, LTD., subjected to surface-treating on one side) (thickness: 100 μm) was used instead of the PFA film surface-treated with TETRAETCH of (1) of Comparative Example 1.

(2) Production of Laminated Plate

Coating of an epoxy adhesive and lamination of surface-treated film on the pre-treated aluminum plate were carried out in the same manner as in (2) of Comparative Example 1 except that the surface-treated FEP film of the above (1) was used instead of the PFA film surface-treated with TETRA-ETCH.

(3) Measurement of Adhesive Strength

Production of a test piece and measurement of adhesive strength were carried out in the same manner as in Comparative Example 1 except that the laminated plate of the above (2) was used instead of the laminated plate obtained in (2) of Comparative Example 1 by using the PFA film treated with TETRAETCH.

(4) Measurement of Heat Resistance of Adhesive Strength

Another laminated plate of the above (2) was produced separately and measurement was carried out by using it in the same manner as in (3) of Example 3. The results are shown in Table 3.

COMPARATIVE EXAMPLES 5 to 6

Heat Resistance of Adhesive Strength of Laminated Plate Having Surface-treated Fluorine-containing Resin Film Production of laminated plates and measurements of adhesive strength and heat resistance of adhesive strength were carried out in the same manner as in Comparative Example 4 except that a SUS430 steel plate (Comparative Example 5) subjected to the same pre-treatment as in the aluminum plate and a galvanized steel plate (Comparative Example 6) subjected to only degreasing were used, respectively instead of the aluminum plate. The results are shown in Table 3.

TABLE 3

| Laminated article | Example 3 | Example 4 | Example 5 |
|---|---|---|---|
| Appearance | Transparent film | Transparent film | Transparent film |
| Substrate | Aluminum | SUS430 | Galvanized steel plate |
| Surface layer | PFA film having no OH group[1] | PFA film having no OH group[1] | PFA film having no OH group[1] |
| Adhesive layer | PFA film having OH group[2] | PFA film having OH group[2] | PFA film having OH group[2] |
| Film thickness (μm) | 180 to 220 | 170 to 200 | 200 to 230 |

| | Com. Ex. 1 | Com. Ex. 2 | Com. Ex. 3 | Com. Ex. 4 | Com. Ex. 5 | Com. Ex. 6 |
|---|---|---|---|---|---|---|
| | Brown Aluminum | Brown SUS430 | Brown Galvanized steel plate | Brown Aluminum | Brown SUS430 | Brown Galvanized steel plate |
| | PFA film surface-treated with TETRA-ETCH | PFA film surface-treated with TETRA-ETCH | PFA film surface-treated with TETRA-ETCH | Surface-treated FEP film[4] | Surface-treated FEP film[4] | Surface-treated FEP film[4] |
| | Heat resistant epoxy adhesive[3] 150 to 190 | Heat resistant epoxy adhesive[3] 160 to 190 | Heat resistant epoxy adhesive[3] 170 to 190 | Heat resistant epoxy adhesive[3] 130 to 160 | Heat resistant epoxy adhesive[3] 160 to 180 | Heat resistant epoxy adhesive[3] 160 to 180 |
| Initial adhesive strength | | | | | | |
| N/mm (kgf/cm) | | | | 2.1 (2.1) | 2.5 (2.5) | 2.2 (2.2) |
| Heat resistance of adhesive strength | | | | | | |
| Adhesive strength after heating at 300° C. for 200 hours N/mm (kgf/cm) | | | | 2.0 or more (breakage of film) (2.0 or more) | 2.2 (2.2) | 2.0 or more (breakage of film) (2.0 or more) |
| Adhesive strength after heating at 300° C. for 500 hours N/mm (kgf/cm) | | | | 2.0 or more (breakage of film) (2.0 or more) | 1.6 or more (breakage of film) (1.6 or more) | 2.0 or more (breakage of film) (2.0 or more) |
| | 1.6 (1.6) | 1.0 (1.0) | 1.6 (1.6) | 1.5 (1.5) | 1.5 (1.5) | 1.5 (1.5) |
| | Spontaneously peeled (at substrate side) | Spontaneously peeled (at substrate side) | Spontaneously peeled (at substrate side) | Spontaneously peeled (at substrate side) | Spontaneously peeled (at substrate side) | Spontaneously peeled (at substrate side) |
| | Spontaneously peeled (at substrate side) | Spontaneously peeled (at substrate side) | Spontaneously peeled (at substrate side) | Spontaneously peeled (at substrate side) | Spontaneously peeled (at substrate side) | Spontaneously peeled (at substrate side) |

[1] NEOFLON PFA Film AF-0100 available from DAIKIN INDUSTRIES, LTD.
[2] Film obtained in Preparation Example 2
[3] HITEMP HT-100L available from Kabushiki Kaisha Konishi
[4] NEOFLON FEP Film NF-0100B1 available from DAIKIN INDUSTRIES, LTD.

PREPARATION EXAMPE 3

Blend of PFA and Carbon Fiber

PFA (NEOFLON PFA AP-201 available from DAIKIN INDUSTRIES, LTD.) and carbon fiber (KREKACHOP M-207S available from Kureha Chemical Industry Co., Ltd.) were blended uniformly at 80:20 (weight ratio) by using a rocking mixer, followed by kneading at 350° to 370° C. and extruding with a twin screw extruder (LABOPLASTOMILL available from Toyo Seiki Kabushiki Kaisha) to give pellets.

PREPARATION EXAMPLE 4

Blend of PFA With Aluminum Borate Whisker

PFA (NEOFLON PFA AP-201 available from DAIKIN INDUSTRIES, LTD.) was blended uniformly with aluminum borate whisker (ALBOREX Y available from Shikoku Kasei Kogyo Kabushiki Kaisha) at 92:8 (weight ratio) by using a rocking mixer, followed by kneading at 350° to 370° C. and extruding with a twin screw extruder (LABOPLASTOMILL available from Toyo Seiki Kabushiki Kaisha) to give pellets.

PREPARATION EXAMPLE 5

Production of Film of PFA Containing Carbon Fiber

PFA pellets containing carbon fiber and obtained in Preparation Example 3 were put in a metal die of 100 mm diameter and set on a press machine of 350° C., followed by preheating for 30 minutes and then compression-molding at 6.9 MPa (70 kgf/cm$^2$) for one minute. Thus a 0.5 mm thick PFA film containing carbon fiber was obtained.

PREPARATION EXAMPLE 6

Production of PFA Film Containing Aluminum Borate Whisker

Compression molding was carried out in the same manner as in Preparation Example 5 except that the PFA pellets containing aluminum borate whisker and obtained in Preparation Example 4 were used instead of the pellets obtained in Preparation Example 3 to give a 0.5 mm thick PFA film containing aluminum borate whisker.

EXAMPLE 6

Lamination of PFA Film Containing Carbon Fiber to Aluminum Plate

Figure 6:
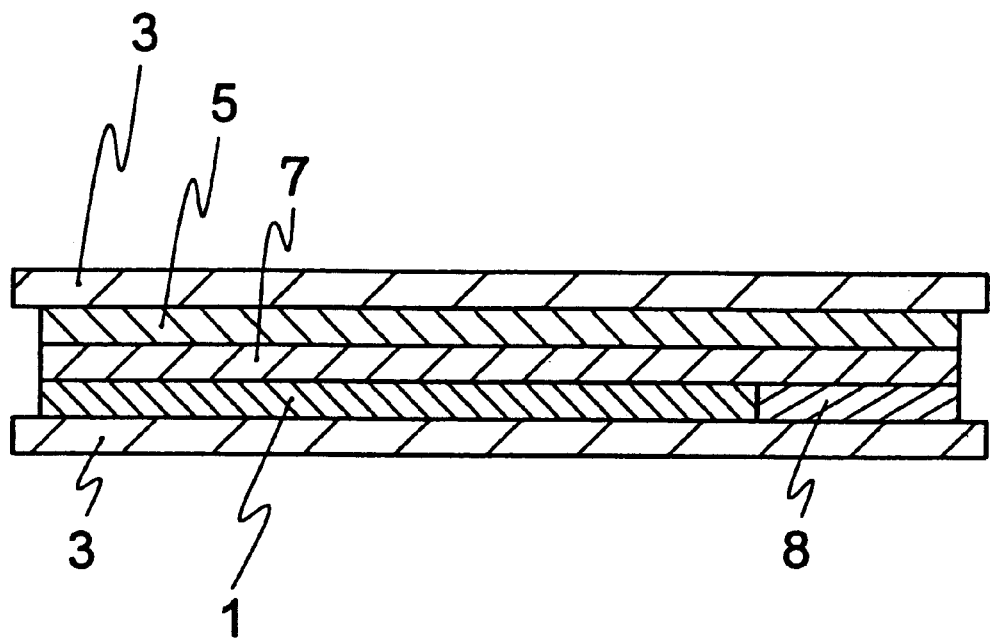
FIG. 6 is a diagrammatic cross-sectional view of a laminated test plate made for making a laminated article in Example 6 of the present invention.

A laminated test plate was produced in the manner mentioned below by using a degreased pure aluminum plate of 150 mm long×70 mm wide×0.5 mm thick as a metal plate. FIG. 6 is a diagrammatic cross-sectional view of the obtained laminated test plate.

Figure 7:
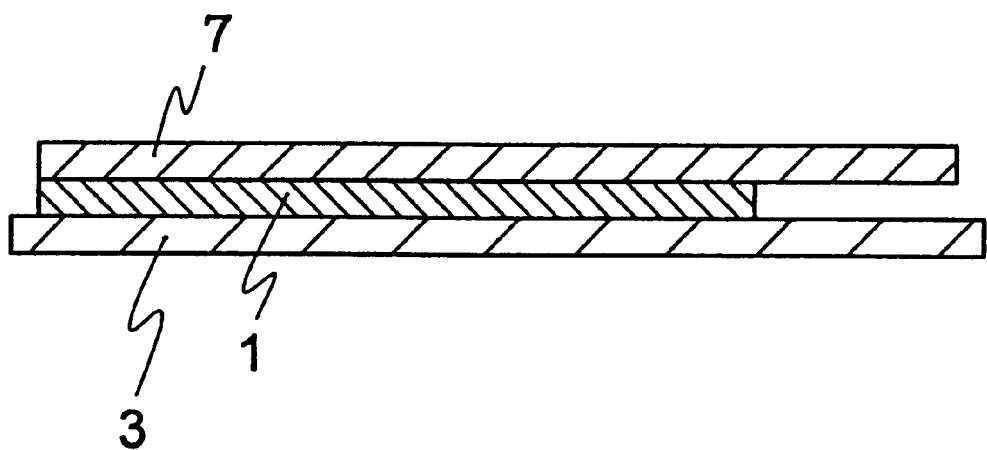
FIG. 7 is a diagrammatic cross-sectional view of a laminated article made in Example 6 of the present invention.

As shown in FIG. 6, the PFA film 1 having hydroxyl and obtained in Preparation Example 2, the PFA film 7 containing carbon fiber and obtained in Preparation Example 5 and the polyimide film 5 were put between the two aluminum plates 3, and a spacer 8 (0.1 mm thick aluminum foil) was inserted partly in the same layer as the PFA film 1 and then set on a press machine preset at 350° C., followed by preheating (20 minutes) and then pressing at 4.9 MPa (50 kgf/cm$^2$) for one minute. After cooling, the aluminum plate 3 contacting the polyimide film 5, the polyimide film 5 and the spacer 8 were removed to give a structural member. FIG. 7 is a diagrammatic cross-sectional view of the obtained structural member.

Figure 8:
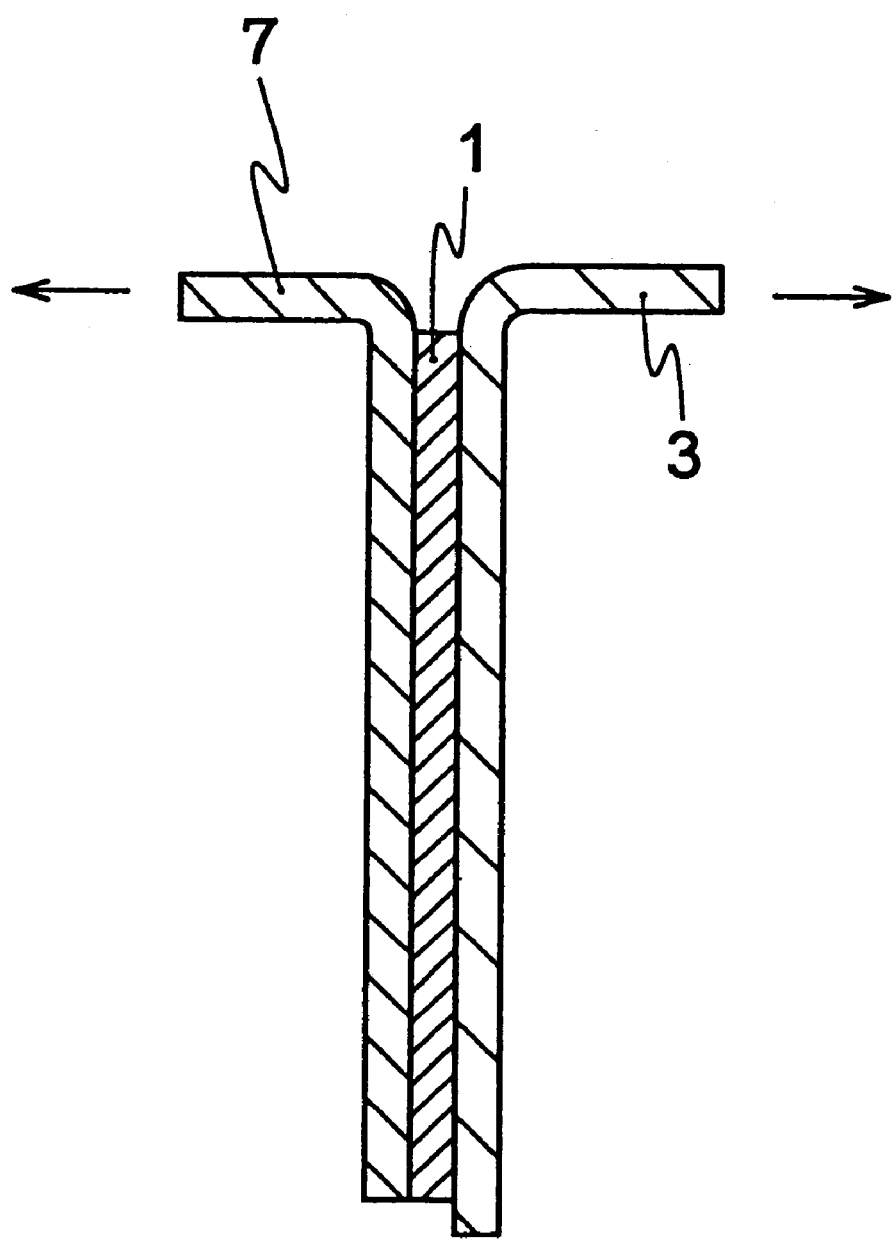
FIG. 8 is a diagrammatic cross-sectional view of a laminated article to be subjected to T-type peeling test in Example 6 of the present invention.

FIG. 8 is a diagrammatic cross-sectional view of the above-mentioned laminated article to be subjected to T-type peeling test. The peeling test (cross head speed of 0.05 m/min (50 mm/min)) was carried out at room temperature by pulling the PFA film 7 containing a filler (carbon fiber) and the aluminum plate 3 in the directions shown in FIG. 8 by using TENSILON Universal Tester (available from Orientec Corporation) according to T-type peeling test method of JIS K6854-1977. The adhesive strength was 1.9 N/mm (4.8 kgf/25 mm) as an average load at peeling according to area method.

EXAMPLE 7

Lamination of PFA Film Containing Aluminum Borate Whisker to Aluminum Plate

A structural member of PFA containing aluminum borate whisker and aluminum plate was obtained in the same manner as in Example 6 except that the PFA film containing aluminum borate whisker and obtained in Preparation Example 6 was used instead of the PFA film containing carbon fiber and obtained in Preparation Example 5. Measurement of adhesive strength between the PFA layer containing aluminum borate whisker and the aluminum plate was carried out in the same manner as in Example 6 by T-type peeling test. The adhesive strength was 1.8 N/mm (4.6 kgf/25 mm) as an average load at peeling according to area method.

EXAMPLE 8

Sliding Test

The sliding test was carried out in the manner mentioned below by using the composite material obtained by laminating the PFA film containing carbon fiber and obtained in Example 6 to the aluminum plate.

Friction and Abrasion Test by Thrust

① Preparation of test sample and counterpart material

Aluminum die cast (ADC 12) was used as a counterpart material. A surface of PFA film containing carbon fiber of a structural member which was obtained by laminating the carbon fiber-containing PFA film produced in Example 6 on the aluminum plate and a contacting surface of the counterpart material were subjected to grinding with a grinder to give surface roughness RA of not more than 0.5 μm and Rmax of not more than 5 mm.

② Friction and Abrasion Test

A coefficient of friction was measured at room temperature in the air at a speed of 60 m/min at a load of 0.49 MPa (5.0 kgf/cm$^2$) by using Suzuki-Matsubara type friction and abrasion tester available from Orientec Corporation. The results are shown in Table 4.

EXAMPLE 9

A sliding test was carried out in the same manner as in Example 8 except that the structural member produced in Example 7 by laminating the PFA film containing aluminum borate whisker to an aluminum plate was used instead of the structural member produced in Example 6 by laminating a PFA film containing carbon fiber to an aluminum plate. The obtained coefficient of friction is shown in Table 4.

TABLE 4

|  | Ex. 8 | Ex. 9 |
|---|---|---|
| Coefficient of friction | 0.15 | 0.17 |

EXAMPLE 10

Adhesion of Laminated Plate of PTFE Containing a Filler (1) Production of Laminated Plate An aluminum plate of 150×70×5 mm subjected to only degreasing was used as a substrate. A three layered structural member comprising a film (one obtained in Preparation Example 2) of PFA having functional group as an adhesive layer, PTFE containing a filler and aluminum plate was produced in the same manner as in Example 3 except that the above-mentioned aluminum plate was used and a 0.5 mm thick sheet obtained by molding PTFE (POLYFLON TFE Molding Powder MG-2030 available from DAIKIN INDUSTRIES, LTD.) containing 15% by weight of graphite was used instead of a PFA film having no functional group.

(2) Adhesive Strength

An adhesive strength was measured by peeling the PTFE layer containing a filler and pulling the sheet of 10 mm wide at an angle of 90 degrees to the substrate in the same manner as in (2) of Example 3. The results are shown in Table 5.

EXAMPLES 11 to 13

Adhesion of Laminated Plate of PTFE Containing a Filler

Production of a laminated aluminum plate and measurement of adhesive strength were carried out in the same manner as in Example 10 except that instead of the PTFE sheet containing graphite, a 0.5 mm thick sheet obtained by molding PTFE (POLYFLON TFE Molding Powder MG1431 available from DAIKIN INDUSTRIES, LTD.) containing 15% of glass fiber and 5% of molybdenum disulfide was used (Example 11), a 0.5 mm thick sheet obtained by molding PTFE containing 30% of bronze and 10% of carbon fiber was used (Example 12) and a 0.5 mm thick sheet obtained by molding PTFE containing 20% of aromatic polyester resin (SUMIKA SUPER available from Sumitomo Chemical Industries Co., Ltd.) was used (Example 13). The results are shown in Table 5.

EXAMPLE 14

Adhesion of Laminated Plate of PTFE Containing a Filler

A structural member comprising an adhesive layer of PFA having functional group, PTFE containing graphite and SUS plate was produced in the same manner as in Example 10 except that a SUS 304 plate having a size of 150×70×2.5 mm subjected to degreasing was used as a substrate instead of an aluminum plate, and an adhesive strength was measured. The results are shown in Table 5.

EXAMPLES 15 to 17

Adhesion of Laminated Plate of PTFE Containing a Filler

Production of a laminated plate of SUS304 and measurement of adhesive strength were carried out in the same manner as in Example 14 except that instead of the PTFE sheet containing graphite, a 0.5 mm thick sheet obtained by molding PTFE (POLYFLON TFE Molding Powder MG1431 available from DAIKIN INDUSTRIES, LTD.) containing 15% of glass fiber and 5% of molybdenum disulfide was used (Example 15), a 0.5 mm thick sheet obtained by molding PTFE containing 30% of bronze and 10% of carbon fiber was used (Example 16) and a 0.5 mm thick sheet obtained by molding PTFE containing 20% of aromatic polyester resin (SUMIKA SUPER available from Sumitomo Chemical Industries Co., Ltd.) was used (Example 17). The results are shown in Table 5.

COMPARATIVE EXAMPLE 7

The same procedures as in Example 10 were repeated except that the PFA film having functional group used as an adhesive layer was not used, to give a structural member comprising a PTFE sheet containing 15% of graphite (the same one as in Example 10) and an aluminum plate. An adhesive strength was measured and the results are shown in Table 5.

COMPARATIVE EXAMPLES 8 to 10

Production of a structural member comprising an aluminum plate and PTFE containing a filler and measurement of adhesive strength were carried out in the same manner as in Comparative Example 7 except that instead of the PTFE sheet containing 15% of graphite, the PTFE sheet of Example 11 containing 15% of glass fiber and 5% of molybdenum disulfide was used (Comparative Example 8), the PTFE sheet of Example 12 containing 30% of bronze and 10% of carbon fiber was used (Comparative Example 9) and the PTFE sheet of Example 13 containing 20% of aromatic polyester resin was used (Comparative Example 10). The results are shown in Table 5.

COMPARATIVE EXAMPLE 11

The same procedures as in Example 14 were repeated except that the PFA film having functional group used as an adhesive layer was not used, to give a structural member comprising a PTFE sheet containing 15% of graphite (the same one as in Example 14) and a SUS plate. An adhesive strength was measured and the results are shown in Table 5.

COMPARATIVE EXAMPLES 12 to 14

Production of a structural member comprising a SUS plate and PTFE containing a filler and measurement of adhesive strength were carried out in the same manner as in Comparative Example 11 except that instead of the PTFE sheet containing 15% of graphite, the PTFE sheet of Example 15 containing 15% of glass fiber and 5% of molybdenum disulfide was used (Comparative Example 12), the PTFE sheet of Example 16 containing 30% of bronze and 10% of carbon fiber was used (Comparative Example 13) and the PTFE sheet of Example 17 containing 20% of aromatic polyester resin was used (Comparative Example 14). The results are shown in Table 5.

TABLE 5

| | Substrate | Surface layer | Adhesive layer | Adhesion |
|---|---|---|---|---|
| Ex. 10 | Aluminum | PTFE containing graphite | OH group-containing PFA[1] | 2.3 N/mm (2.3 kgf/cm) |
| Com. Ex. 7 | Aluminum | PTFE containing graphite | — | Not adhered |

TABLE 5-continued

| | Substrate | Surface layer | Adhesive layer | Adhesion |
|---|---|---|---|---|
| Ex. 11 | Aluminum | PTFE containing glass fiber and molybdenum disulfide | OH group-containing PFA | 2.7 N/mm (2.8 kgf/cm) |
| Com. Ex. 8 | Aluminum | PTFE containing glass fiber and molybdenum disulfide | — | Not adhered |
| Ex. 12 | Aluminum | PTFE containing bronze and carbon fiber | OH group-containing PFA | 2.9 N/mm (3.0 kgf/cm) |
| Com. Ex. 9 | Aluminum | PTFE containing bronze and carbon fiber | — | Not adhered |
| Ex. 13 | Aluminum | PTFE containing aromatic polyester | OH group-containing PFA | 3.5 N/mm (3.6 kgf/cm) |
| Com. Ex. 10 | Aluminum | PTFE containing aromatic polyester | — | Not adhered |
| Ex. 14 | SUS304 | PTFE containing graphite | OH group-containing PFA | 2.0 N/mm (2.0 kgf/cm) |
| Com. Ex. 11 | SUS304 | PTFE containing graphite | — | Not adhered |
| Ex. 15 | SUS304 | PTFE containing glass fiber and molybdenum disulfide | OH group-containing PFA | 2.5 N/mm (2.6 kgf/cm) |
| Com. Ex. 12 | SUS304 | PTFE containing glass fiber and molybdenum disulfide | — | Not adhered |
| Ex. 16 | SUS304 | PTFE containing bronze and carbon fiber | OH group-containing PFA | 2.6 N/mm (2.7 kgf/cm) |
| Com. Ex. 13 | SUS304 | PTFE containing bronze and carbon fiber | — | Not adhered |
| Ex. 17 | SUS304 | PTFE containing aromatic polyester | OH group-containing PFA | 3.2 N/mm (3.3 kgf/cm) |
| Com. Ex. 14 | SUS304 | PTFE containing aromatic polyester | — | Not adhered |

[1]Film obtained in Preparation Example 2.

EXAMPLE 18

Adhesion of Laminated Plate of Modified PTFE (1) Production of Laminated Plate

A carbon steel S45C of 100×25×1.5 mm was used as a substrate. A structural member was produced in the same manner as in Example 2, in which the PFA film having a thickness of 100 μm was used, except that instead of a single use of a PFA film (A) having hydroxyl represented by numeral 1 in FIG. 1, three layers comprising a PFA film (A) having hydroxyl (thickness: 50 μm), a 0.5 mm thick sheet produced by molding a modified PTFE (C) (tetrafluoroethylene polymer prepared by copolymerizing 0.1% by mole of perfluoro(propyl vinyl ether)) in the same manner as in Example 10 and the PFA film (A) having hydroxyl (thickness: 50 μm) were used.

(2) Adhesive Strength

A longitudinal shear strength was measured according to JIS K6850 at 25° C. and 150 ° C., respectively. The results are shown in Table 6.

EXAMPLES 19 to 20

Adhesion of Laminated Plate of Modified PTFE Containing Filler

Production of a laminated plate of S45C and measurement of adhesive strength were carried out in the same manner as in Example 18 except that instead of the modified PTFE sheet, a 0.5 mm thick sheet produced by molding modified PTFE containing 15% by weight of aromatic polyester resin (SUMIKA SUPER available from Sumitomo Chemical Industries Co., Ltd.) and 5% by weight of graphite was used (Example 19) and a 0.5 mm thick sheet produced by molding modified PTFE containing 30% of bronze and 10% of carbon fiber was used (Example 20). The results are shown in Table 6.

COMPARATIVE EXAMPLE 15

Adhesion of Laminated Plate Produced by Using Surface-treated Modified PTFE Sheet (1) Surface Treatment of Modified PTFE Sheet A surface-treated modified PTFE sheet was produced in the same manner as in Comparative Example 1 except that a 0.5 mm thick sheet produced by molding modified PTFE (tetrafluoroethylene polymer prepared by copolymerizing 0.1% by mole of perfluoro(propyl vinyl ether)) (length a: 12.5 mm, width b: 25 mm) was dipped in TETRAETCH A solution for eight seconds.

(2) Production of Laminated Plate

A S45C carbon steel plate subjected to the same pre-treatment as in Example 2 was coated with a two-liquid type heat resistant epoxy adhesive (HITEMP HT-100L available from Kabushiki Kaisha Konishi). The modified PTFE sheet surface-treated in the above (1) was brought into close contact with the adhesive layer of the substrate, followed by heating at 120° C. for one hour and baking at 180° C. for twenty hours for curing to adhere them.

(3) Measurement of Adhesive Strength

A longitudinal shear strength was measured in the same manner as in Example 18. The results are shown in Table 6.

COMPARATIVE EXAMPLES 16 to 17

Adhesion of Laminated Plate Produced by Using Surface-treated Modified PTFE Sheet Containing Filler Production of a laminated plate of S45C and measurement of adhesive strength were carried out in the same manner as in Comparative Example 15 except that instead of the surface-treated modified PTFE sheet, a surface-treated sheet of modified PTFE containing 15% of aromatic polyester resin (SUMIKA SUPER available from Sumitomo Chemical Industries Co., Ltd.) and 5% of graphite was used (Comparative Example 16) and a surface-treated sheet of modified PTFE containing 30% of bronze and 10% of carbon fiber was used (Comparative Example 17). The results are shown in Table 6.

EXAMPLES 21 to 24

Adhesion of Laminated Plate of Engineering Plastic

Production of a laminated plate of S45C and measurement of adhesive strength were carried out in the same manner as in Example 18 except that instead of the modified PTFE sheet, a polyimide film (APICAL 50 AH available from KANEKA CORPORATION, thickness: 50 μm) (Example 21), a PEEK film (FS-1100C available from SUMITOMO BAKELITE COMPANY LIMITED, thickness: 50 μm) (Example 22), a PES film (FS-5300 available from SUMITOMO BAKELITE COMPANY LIMITED, thickness: 50 μm) (Example 23) and a PPS film (Torelina available from TORAY CO., LTD., thickness: 50 μm) (Example 24) were used and that a pressing temperature was set at 320° C. The results are shown in Table 6.

EXAMPLE 25

Adhesion of PI Laminated Plate (1) Production of Laminated Plate

A SUS304 plate of 100×50×1 mm subjected to only degreasing was used as a substrate. A three-layered structural member comprising a PI film, SUS304 plate and the PFA film having functional group (obtained in Preparation Example 2) as an adhesive layer was produced in the same manner as in Example 3 except that the above-mentioned substrate and a PI film (KAPTON 200-H available from Du Pont, thickness: 50 μm) were used and a pressing temperature was set at 320° C.

(2) Adhesive Strength

The PI film was turned up and a 10 mm wide sheet was pulled at an angle of 90 degrees to the substrate in the same manner as in (2) of Example 3. The results of measurement are shown in Table 7.

EXAMPLE 26

Adhesion of PI Laminated Plate

Production of a laminated plate and measurement of adhesive strength were carried out in the same manner as in Example 25 except that a degreased titanium plate of 100×50×0.5 mm was used as a substrate instead of the SUS304 plate. The results are shown in Table 7.

COMPARATIVE EXAMPLE 18

Production of a laminated plate and measurement of adhesive strength were carried out in the same manner as in Example 25 except that a film of PFA having no functional group (NEOFLON PFA AP-201 available from DAIKIN INDUSTRIES, LTD. was formed into a film) was used as an adhesive layer. The results are shown in Table 7.

COMPARATIVE EXAMPLE 19

Production of a laminated plate and measurement of adhesive strength were carried out in the same manner as in Example 26 except that a film of PFA having no functional group (NEOFLON PFA AP-201 available from DAIKIN INDUSTRIES, LTD. was formed into a film) was used as an adhesive layer. The results are shown in Table 7.

TABLE 6

|  | Ex. 18 | Ex. 19 | Ex. 20 |
| --- | --- | --- | --- |
| Laminated article |  |  |  |
| Substrate | S45L | S45L | S45L |
| Intermediate layer | Modified PTFE[3] | Modified PTFE containing 15% of ECONOL and 5% of graphite[3] | Modified PTFE containing 30% of bronze and 10% of carbon fiber[3] |
| Adhesive layer | PFA film containing OH[1] | PFA film containing OH[1] | PFA film containing OH[1] |
| Adhesive strength |  |  |  |
| 25° C. | 12.2 N/mm$^2$ (124 kgf/cm$^2$) | 11.7 N/mm$^2$ (119 kgf/cm$^2$) | 12.3 N/mm$^2$ (126 kgf/cm$^2$) |
| 150° C. | 5.8 N/mm$^2$ (59 kgf/cm$^2$) | 5.1 N/mm$^2$ (52 kgf/cm$^2$) | 5.4 N/mm$^2$ (55 kgf/cm$^2$) |

| Com. Ex. 15 | Com. Ex. 16 | Com. Ex. 17 | Ex. 21 | Ex. 22 | Ex. 23 | Ex. 24 |
| --- | --- | --- | --- | --- | --- | --- |
| S45L | S45L | S45L | S45L | S45L | S45L | S45L |
| Modified PTFE surface-treated with TETRAETCH[3] | Modified PTFE containing SUMIKA SUPER and graphite and surface-treated with TETRAETCH[3] | Modified PTFE containing bronze and carbon and surface-treated with TETRAETCH[3] | PI | PEEK | PES | PPS |
| Heat resistant epoxy adhesive[2] | Heat resistant epoxy adhesive[2] | Heat resistant epoxy adhesive[2] | PFA film containing OH[1] | PFA film containing OH[1] | PFA film containing OH[1] | PFA film containing OH[1] |
| 8.8 N/mm$^2$ (90 kgf/cm$^2$) | 8.2 N/mm$^2$ (84 kgf/cm$^2$) | 9.1 N/mm$^2$ (93 kgf/cm$^2$) | 12.8 N/mm$^2$ (131 kgf/cm$^2$) | 10.4 N/mm$^2$ (106 kgf/cm$^2$) | 11.3 N/mm$^2$ (115 kgf/cm$^2$) | 13.4 N/mm$^2$ (137 kgf/cm$^2$) |

TABLE 6-continued

| 4.2 N/mm² (43 kgf/cm²) | 4.0 N/mm² (41 kgf/cm²) | 4.3 N/mm² (44 kgf/cm²) | — | — | — | — |

[1] Film obtained in Preparation Example 2.
[2] HITEMP HT-100L available from Kabushiki Kaisha Konishi
[3] Non-melt-processable tetrafluoroethylene polymer prepared by copolymerizing 0.1% by mole of perfluoro(propyl vinyl ether).
—: Not measured

TABLE 7

|  | Ex. 25 | Com. Ex. 18 | Ex. 26 | Com. Ex. 19 |
|---|---|---|---|---|
| Substrate | SUS304 | SUS304 | Titanium | Titanium |
| Surface layer | PI film | PI film | PI film | PI film |
| Adhesive layer | OH-containing PFA film | PFA film | OH-containing PFA film | PFA film |
| Adhesive strength |  |  |  |  |
| N/mm (kgf/cm) | 1.3 (1.3) | 0.4 (0.4) | 1.4 (1.4) | 0.2 (0.2) |

INDUSTRIAL APPLICABILITY

According to the present invention, a structural member produced by applying on a substrate a material comprising a fluorine-containing polymer being excellent in adhesion to a substrate, particularly adhesion at high temperature without necessitating complicated steps can be obtained. Also according to the present invention, a structural member which is further excellent in heat resistance, stain-proofing property, non-sticking property, water- and oil-repellency, stain removability, chemical resistance, rust-preventing property, antibacterial property, energy ray resistance and friction property can be obtained, and can be used suitably in the fields of OA-related apparatuses, cars, domestic appliances and chemical industry.

What is claimed is:

1. A structural member comprising (A) a layer which comprises a fluorine-containing polymer and does not contain an adhesive material other than the fluorine-containing polymer substantially, (B) a synthetic resin substrate and (C) a layer different from the fluorine-containing polymer layer (A) obtained by laminating with the layer (A); the layer (A) is adhered directly to the substrate (B) without interposing a binder therebetween and a longitudinal shear strength between the layer (A) comprising the fluorine-containing polymer and the substrate (B) is not less than 0.98 N/mm² (10 kgf/cm²) at 150° C. and the synthetic resin of the substrate (B) is at least one synthetic resin selected from the group consisting of aromatic polyester, polyimide, phenolic resin, COPNA resin, PPS, PEEK, PES, PAI, PEI, thermoplastic PI and polyoxymethylene, and the layer (C) is at least one synthetic resin selected from the group consisting of aromatic polyester, polyimide, phenolic resin, COPNA resin, PPS, PEEK, PES, PAI, PEI and thermoplastic PI.

2. The structural member of claim 1, wherein the longitudinal shear strength between the layer (A) comprising the fluorine-containing polymer and the substrate (B) is not less than 0.98 N/mm² (10 kgf/cm²) at 200° C.

3. The structural member of claim 1, wherein the longitudinal shear strength between the layer (A) comprising the fluorine-containing polymer and the substrate (B) is not less than 1.96 N/mm² (20 kgf/cm²) at 150° C.

4. The structural member of claim 1, wherein the fluorine-containing polymer of the layer (A) is selected from fluorine-containing ethylenic polymers.

5. The structural member of claim 4, wherein a thermal degradation temperature at 1% weight loss of the fluorine-containing polymer of the layer (A) is not less than 300° C. and a crystalline melting point thereof is not less than 250° C.

6. The structural member of claim 5, wherein a crystalline melting point of the fluorine-containing polymer of the layer (A) is not less than 300° C.

7. The structural member of claim 1, wherein the substrate (B) is a polyimide substrate.

8. The structural member of claim 1, wherein the layer (C) is a layer of polyimide.

9. The structural member of claim 1, wherein the layer (C) is a layer of a composition comprising 30 to 99% by volume of thermosetting resin or heat resistant engineering plastic and 1 to 70% by volume of a filler selected from inorganic fillers or organic fillers.

10. The structural member of claim 9, wherein the filler of the layer (C) is at least one selected from a carbon fiber, glass fiber, graphite, bronze, molybdenum disulfide, aluminum borate whisker and aromatic polyesters.

11. The structural member of claim 1, wherein a thermal degradation temperature at 1% weight loss of the polymer component of the layer (C) different from the layer (A) comprising the fluorine-containing polymer is not less than 300° C. and a crystalline melting point thereof is not less than 250° C.

12. The structural member of claim 11, wherein a crystalline melting point of the polymer component of the layer (C) different from the layer (A) comprising the fluorine-containing polymer is not less than 300° C.

13. A sliding material produced by using the structural member of claim 1.

14. A bearing produced by processing the sliding material of claim 13.

15. A method of endowing a structural member comprising (A) a layer which comprises a fluorine-containing polymer and does not contain an adhesive material other than the fluorine-containing polymer substantially, (B) a synthetic resin substrate and (C) a layer different from the fluorine-containing polymer layer (A) obtained by laminating with the layer (A) with a longitudinal shear strength between the layer (A) comprising the fluorine-containing polymer and the substrate (B) of not less than 0.98 N/mm (10 kgf/cm²) at 150° C.; which method comprises directly adhering the layer (A) to the substrate (B) without interposing a binder therebetween, and the synthetic resin of the substrate (B) being at least one synthetic resin selected from the group consisting of aromatic polyester, polyimide, phenolic resin, COPNA resin, PPS, PEEK, PES, PAI, PEI, thermoplastic PI and polyoxymethylene, and the layer (C) is at least one synthetic resin selected from the group consisting of aromatic polyester, polyimide, phenolic resin, COPNA resin, PPS, PEEK, PES, PAI, PEI and thermoplastic PI.

16. The method of claim 15, wherein the longitudinal shear strength between the layer (A) comprising the fluorine-containing polymer and the substrate (B) is not less than 0.98 N/mm² (10 kgf/cm²) at 200° C.

17. The method of claim 15, wherein the longitudinal shear strength between the layer (A) comprising the fluorine-containing polymer and the substrate (B) is not less than 1.96 N/mm$^2$ (20 kgf/cm$^2$) at 150° C.

18. The method of claim 15, wherein the fluorine-containing polymer of the layer (A) is selected from fluorine-containing ethylenic polymers.

19. The method of claim 18, wherein a thermal degradation temperature at 1% weight loss of the fluorine-containing polymer of the layer (A) is not less than 300° C. and a crystalline melting point thereof is not less than 250° C.

20. The method of claim 19, wherein a crystalline melting point of the fluorine-containing polymer of the layer (A) is not less than 300° C.

21. The method of claim 15, wherein the substrate (B) is polyimide substrate.

* * * * *